United States Patent
Ganguli et al.

(10) Patent No.: US 11,412,033 B2
(45) Date of Patent: Aug. 9, 2022

(54) 5G NETWORK EDGE AND CORE SERVICE DIMENSIONING

(71) Applicant: Intel Corporation, Santa Clara, CA (US)

(72) Inventors: Mrittika Ganguli, Chandler, AZ (US); Stephen T. Palermo, Chandler, AZ (US); Valerie J. Parker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/426,241

(22) PCT Filed: Feb. 25, 2020

(86) PCT No.: PCT/US2020/019741
§ 371 (c)(1),
(2) Date: Jul. 28, 2021

(87) PCT Pub. No.: WO2020/176535
PCT Pub. Date: Sep. 3, 2020

(65) Prior Publication Data
US 2022/0103614 A1 Mar. 31, 2022

Related U.S. Application Data

(60) Provisional application No. 62/810,091, filed on Feb. 25, 2019.

(51) Int. Cl.
*G06F 15/16* (2006.01)
*H04L 67/10* (2022.01)
*H04L 67/12* (2022.01)

(52) U.S. Cl.
CPC .............. *H04L 67/10* (2013.01); *H04L 67/12* (2013.01)

(58) Field of Classification Search
CPC .............................. H04L 67/10; H04L 67/12
See application file for complete search history.

(56) References Cited

U.S. PATENT DOCUMENTS

2005/0125792 A1  6/2005  Chang et al.
2017/0223541 A1*  8/2017  Chami ................ H04W 12/084
(Continued)

FOREIGN PATENT DOCUMENTS

JP      2004208316 A    7/2004
WO   WO-2020176535 A1  9/2020

OTHER PUBLICATIONS

"International Application Serial No. PCT/US2020/019741, International Search Report dated Jun. 26, 2020", 3 pgs.
(Continued)

*Primary Examiner* — Normin Abedin
(74) *Attorney, Agent, or Firm* — Schwegman Lundberg & Woessner, P.A.

(57) ABSTRACT

Various systems and methods for implementing a multi-access edge computing (MEC) based system to realize 5G Network Edge and Core Service Dimensioning using Machine Learning and other Artificial Intelligence Techniques, for improved operations and usage of computing and networking resources, are disclosed herein. In an example, processing circuitry of a compute node on a network is used to analyze execution of an application to obtain operational data. The compute node then may modularize functions of the application based on the operational data to construct modularized functions. A phase transition graph is constructed using a machine-learning based analysis, the phase transition graph representing state transitions from one modularized function to another modularized (Continued)

function, where the phase transition graph is used to dimension the application by distributing the modularized functions across the network.

25 Claims, 20 Drawing Sheets

(56) References Cited

U.S. PATENT DOCUMENTS

2017/0317886 A1   11/2017  Leroux et al.
2018/0205666 A1*  7/2018  Nash .................. H04L 43/0876
2019/0349426 A1*  11/2019  Smith ..................... H04W 4/08

OTHER PUBLICATIONS

"International Application Serial No. PCT/US2020/019741, Written Opinion dated Jun. 26, 2020", 4 pgs.

Abbas, Bradai, et al., "Cellular Software Defined Network—a Framework", [Online]. Retrieved from the Internet: <https://www.semantic scholar.org/paper/Cellular-Software-Defined-Network-%E2%80%93-a-Framework-Bradai-Singh/2845e7e7d3951d7b500c84b0b4f28c9cf3b3002c>, (2015), 2-6.

"International Application Serial No. PCT US2020 019741, International Preliminary Report on Patentability dated Sep. 2, 2021", 6 pgs.

* cited by examiner

5G NETWORK EDGE AND CORE SERVICE DIMENSIONING

PRIORITY CLAIM

This application is a U.S. National Stage Application under 35 U.S.C. 371 from International Application No. PCT/US2020/019741, filed Feb. 25, 2020, published as WO 2020/176535, which claims the benefit of priority to U.S. Provisional Application Ser. No. 62/810,091, filed Feb. 25, 2019, all of which are incorporated herein by reference in their entirety.

TECHNICAL FIELD

Embodiments described herein generally relate to data processing, network communication, and communication system implementations, and in particular, to techniques for implementing a 5G or multi-access edge computing (MEC) based system to implement core service dimensioning. Some aspects relate to automatic segmenting of applications and software via dimensioning, to enable the distribution of applications on different devices, and on client, infrastructure and cloud networks.

BACKGROUND

Internet-of-Things (IoT) devices are physical or virtualized objects that may communicate on a network, and may include sensors, actuators, and other input/output components, such as to collect data or perform actions from a real world environment. For example, IoT devices may include low-powered endpoint devices that are embedded or attached to everyday things, such as buildings, vehicles, packages, etc., to provide an additional level of artificial sensory perception of those things. Recently, IoT devices have become more popular and thus applications using these devices have proliferated.

Edge computing, at a more general level, refers to the movement of compute and storage resources closer to, or into, smart endpoint devices in order to optimize total cost of ownership, reduce application latency, improve service capabilities, and improve compliance with security or data privacy requirements. Edge computing may in some scenarios provide a cloud-like distributed service, which offers orchestration and management for applications among many types of storage and compute resources. Edge computing may be further integrated with use cases and technology developed for the IoT and Fog networking, as endpoint devices and gateways attempt to access network resources and applications at locations moved closer to the "edge" of the network.

MEC encompasses architectures that enable cloud computing functionality or information technology (IT) services at network (e.g., cellular network) edges. MEC may reduce network congestion by moving applications, data, discovery, etc. closer to the user (e.g., mobile device, user equipment (UE), station (STA), etc.). Some MEC details dealing with security (e.g., both user security as well as application integrity), radio use, etc., have been promulgated by European Telecommunications Standards Institute (ETSI), such as described in the "Mobile Edge Computing Introductory Technical White Paper," published Sep. 1, 2014. A set of specifications and white papers providing further details and implementation use cases for MEC scenarios is being developed and published on an ongoing basis by ETSI as part of the ETSI MEC industry specification group (ISG).

The MEC environment is characterized by ultra-low latency and high bandwidth as well as real-time access to radio network information that may be leveraged by applications. MEC technology permits operators to flexibly and rapidly deploy innovative applications and services towards mobile subscribers, enterprises and vertical segments. MEC is intended to support developing mobile use cases of edge computing, to allow application developers and content providers to access computing capabilities and an IT service environment in dynamic settings at the edge of the network. In these and other settings, edge computing attempts to offer reduced latency, increased responsiveness, and more available computing power than offered in traditional cloud network services and wide area network connections. Despite the rapid activity occurring with the development of standards and architectures involving these technologies, many limitations and technical problems still exist in the design and use of IoT, MEC, and next-generation edge networks.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
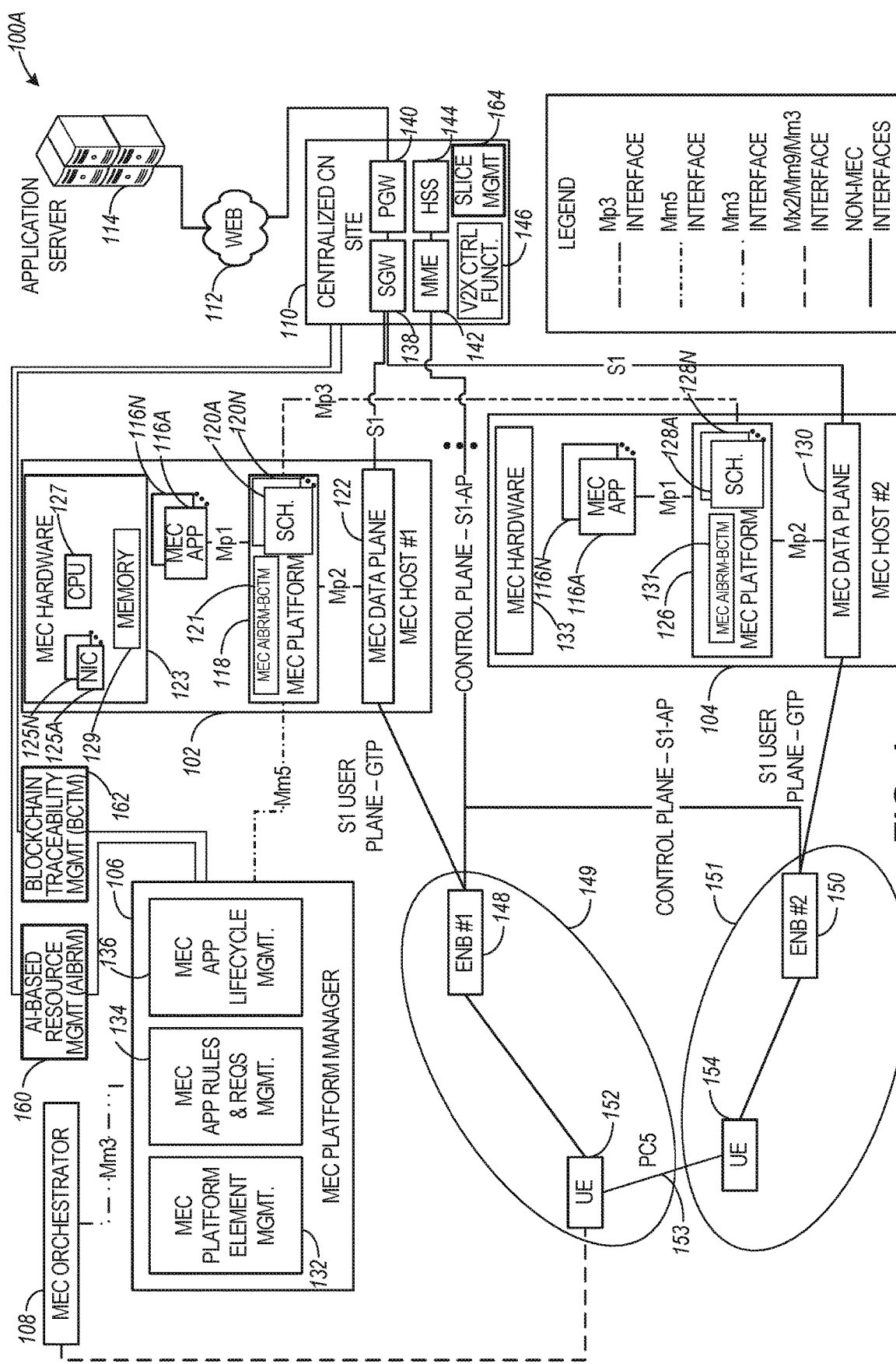
FIG. 1 illustrates a MEC communication infrastructure with a common core network, the MEC infrastructure including slice management, resource management, and traceability functions, according to an example.

In the following description, methods, configurations, and related apparatuses are disclosed for network edge and core service dimensioning utilizing artificial intelligence (AI) techniques and data processing. As an overview, the technological solutions disclosed herein integrate MEC with various types of IoT or Fog/Edge Computing networking implementations with specific forms of dynamic network slicing and resource utilization management. These may benefit a variety of use cases, such as fifth generation (5G) network communications among automotive devices, including those use cases termed as vehicle-to-vehicle (V2V), vehicle-to-infrastructure (V2I), and vehicle-to-everything (V2X). As is understood, MEC architectures offer application developers and content providers cloud-computing capabilities and an IT service environment at the edge of the network. This environment offers ultra-low latency and high bandwidth throughput as well as real-time access to radio network information that may be leveraged by applications. MEC technology permits flexible and rapid deployments of innovative applications and services towards mobile subscribers, enterprises, or vertical segments.

The following configurations provide an enhanced network architecture that allows Data Center Cloud/Core Mobile Services and Applications to be processed closer to the end-user, thereby reducing latencies, allocating computing cycles, and reducing network congestion of 5G subscribers. The process of allocating and distributing applications (or portions of an application, e.g., threads, services, microservices, lambdas, etc.) across an entire network slice (end-to-end premise to core) is known as dimensioning. Dimensioning may also include distributing applications or portions of applications across a layer in a network. Although the following examples are provided with specific reference to a MEC installation, the following systems and techniques may be implemented in, or augment, virtualized environments which may be implemented within various types of MEC, network function virtualization (NFV), or fully virtualized 5G network environments.

As with most MEC installations, the goal with the present configurations is to bring the application endpoints as close to the end user (e.g., vehicular) environment, or endpoints, as possible and to dynamically adjust compute resources as well as resources used by one or more network (e.g., 5G) slices. The following configurations resolve issues related to dimensioning 5G Services across a 5G Network slice dynamically to meet latency, congestion, power, and service provider service level agreement (SLA) requirements. Also, in specific examples, the following configurations use AI/machine learning (ML) based inferences and learning algorithms based on real-time hardware usage heuristics, culminating in a heat map that indicates the optimum "phased" approach to dimensioning workloads across a particular 5G network slice.

The present techniques and configurations may be utilized in connection with many aspects of current networking systems, but are provided with reference to IoT, MEC, and NFV deployments. The present techniques and configurations specifically may be (but are not required to be) relevant to the standards and approaches published in ETSI GS MEC-003 "Mobile Edge Computing (MEC); Framework and Reference Architecture" (e.g., V2.0.3); ETSI GS NFV-SEC 013 "Network Functions Virtualization (NFV) Release 3; Security; Security Management and Monitoring" (e.g., v. 3.1.1) and related MEC, NFV, or networked operational implementations. However, while the present techniques and configurations may provide significant benefits to MEC architectures and other IoT device network architectures, the applicability of the present techniques and configurations may be extended to any number of edge computing devices or fog computing platforms.

The following provides a detailed discussion of these techniques within specific systems and services, but which are applicable to the larger context of IoT, Fog/interconnected networks, and Edge computing deployments. Further, the disclosed MEC architectures and service deployment examples provide one illustrative example of a Fog device or Fog system, but many other combinations and layouts of devices and systems located at the edge of a network may be provided. Further, the techniques disclosed herein may relate to other IoT and network communication standards and configurations, and other intermediate processing entities and architectures.

FIG. 1 illustrates a MEC communication infrastructure 100A with a common core network, the MEC infrastructure including slice management, resource management, and traceability functions, according to an example. The connections represented by some form of a dashed line (as noted in the legend in FIG. 1) may be defined according to a specification from an ETSI MEC standards family.

The MEC communication infrastructure 100A can include entities from a MEC-based architecture as well as entities from a third-generation partnership project (3GPP) based architecture. For example, the MEC communication infrastructure 100A can include a plurality of MEC hosts such as MEC hosts 102 and 104, a MEC platform manager 106, and a MEC orchestrator 108. The 3GPP based entities can include a centralized core network (CN) 110 coupled to an application server 114 via the network 112 (e.g., the Internet), as well as radio access networks (RANs) represented by base stations 148 and 150 coupled to corresponding user equipments (UEs) 152 and 154. The base stations 148 and 150 can include evolved Node-Bs (eNBs), Next Generation Node-Bs (gNBs), or other types of base stations operating in connection with a 3GPP wireless family of standards or another type of wireless standard.

In some aspects, the MEC communication infrastructure 100A can be implemented by different network operators in the same country and/or in different countries, using different network traffic types. For example, the radio access network associated with base station 148 (with a coverage area 149) can be within a first public land mobile network (PLMN) (i.e., associated with a first mobile services provider or operator and a first network traffic type), and base station 150 (with a coverage area 151) can be within a second public land mobile network (PLMN) (i.e., associated with a second mobile services provider or operator and a second network traffic type). As used herein, the terms "mobile services provider" and "mobile services operator" are interchangeable.

In this regard, the MEC communication infrastructure 100A can be associated with a multi-operator scenario composed by two coverage areas 149 and 151 where communication services (e.g., V2X services) can be provided, with each coverage area being operated by a mobile services operator. Additionally, each of the UEs 152 and 154 can be configured for network slice operation, where each UE can use one or more types of network slices configured by, e.g., the core network 110 using the slice management functionality 164. Techniques disclosed herein can be used to provide resource management and resource usage traceability (e.g., via management modules 160 and 162) in connection with computing and communication resources used by the UEs and/or the core network in connection with configuring and using network slices (e.g., 5G slices). In some aspects, techniques disclosed herein can be used to dynamically manage resources used for communication slices (e.g., deploy new slices, re-assign resources from one slice to another, close one or more slices, and so forth).

The solid line connections in FIG. 1 represent non-MEC connections, such as utilizing 3GPP cellular network connections S1, S1-AP, etc. Other connection techniques (e.g., protocols) and connections may also be used. Accordingly, in the scenario of FIG. 1, the system entities (e.g., MEC orchestrator 108, MEC platform manager 106, MEC hosts 102, 104 are connected by MEC (or NFV) logical links (indicated with dashed lines), in addition to network infrastructure links (e.g., a 5G Long Term Evolution (LTE) network, such as provided among UEs 152, 154, eNBs 148, 150, a CN site 110, etc.) (indicated with solid lines). A further connection to cloud services (e.g., an application server 114 access via the network 112) may also be connected via backhaul network infrastructure links.

Techniques disclosed herein apply to 2G/3G/4G/LTE/LTE-A (LTE Advanced) and 5G networks, with the examples and aspects disclosed using 4G/LTE networks. In aspects, the CN 110 may be an evolved packet core (EPC) network, a NextGen Packet Core (NPC) network (e.g., a 5G network), or some other type of CN (e.g., as illustrated in reference to FIGS. 2A-3E). In EPC (Evolved Packet Core), which is associated with 4G/LTE, the CN 110 can include a serving gateway (S-GW or SGW) 138, a packet data network (PDN) gateway (P-GW or PGW) 140, a mobility management entity (MME) 142, and a home subscriber server (HSS) 144 coupled to a V2X control function 146. In 5G, the Core Network is referred to as the NextGen Packet Network (NPC). In NPC (and as illustrated in FIGS. 3A-3D), the S/P-GW is replaced with a user plane function (UPF), and the MME is replaced with two individual functional components, the Access Management Function (AMF) and the Session Management Function (SMF). The 4G HSS is split into different entities in 5G: the Authentication Server Function (AUSF) and the Universal Data Management (UDM), with the subscription data being managed via the Universal Data Management (UDM) function. In EPC, the S1 interface can be split into two parts: the S1-U (user plane) interface which carries traffic data between the eNBs 148, 150 and the S-GW 138 via the MEC hosts 102, 104, and the S1-AP (control plane) interface which is a signaling interface between the eNBs 148, 150 and the MME 142.

The MME 142 may be similar in function to the control plane of legacy Serving General Packet Radio Service (GPRS) Support Nodes (SGSN). The MME 142 may manage mobility aspects in access such as gateway selection and tracking area list management. The HSS 144 may comprise a database for network users, including subscription-related information to support the network entities' handling of communication sessions, including subscription information associated with V2X communications. The CN 110 may comprise one or several HSSs 144, depending on the number of mobile subscribers, on the capacity of the equipment, on the organization of the network, etc. For example, the HSS 144 can provide support for routing/roaming, authentication, authorization (e.g., V2X communication authorization), naming/addressing resolution, location dependencies, etc.

The S-GW 138 may terminate the S1 interface 413 towards the RANs of eNBs 148, 150, and route data packets between the RANs and the CN 110. In addition, the S-GW 138 may be a local mobility anchor point for inter-RAN node handovers and also may provide an anchor for inter-3GPP mobility. Other responsibilities may include charging and some policy enforcement.

The P-GW 140 may terminate an SGi interface toward a PDN. The P-GW 140 may route data packets between the RANs and external networks such as a network including the application server (AS) 114 (alternatively referred to as application function (AF)) via an Internet Protocol (IP) interface (e.g., an interface to the network 112 coupled to the AS 114. The P-GW 140 can also communicate data to other external networks, which can include the Internet, IP multimedia subsystem (IPS) network, and other networks. Generally, the application server 114 may be an element offering applications that use IP bearer resources with the core network (e.g., UMTS Packet Services (PS) domain, LTE PS data services, etc.). The application server 114 can also be configured to support one or more communication services (e.g., Voice-over-Internet Protocol (VoIP) sessions, PTT sessions, group communication sessions, social networking services, etc.) for the UEs 152, 154 via the CN 110 and one or more of the MEC hosts 102, 104.

The P-GW 140 may further include a node for policy enforcement and charging data collection. A Policy and Charging Enforcement Function (PCRF) (not illustrated in FIG. 1) can be the policy and charging control element of the CN 110. In a non-roaming scenario, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF may be communicatively coupled to the application server 114 via the P-GW 140. The application server 114 may signal the PCRF to indicate a new service flow and select the appropriate Quality of Service (QoS) and charging parameters.

The V2X control function 146 is used in connection with authorizing UEs to use V2X services based on HSS information (e.g., subscription information managed by the HSS 144), assist one or more UEs in obtaining the network address of an application server (e.g., 114) or a V2X application server, as well as providing V2X configuration parameters for direct communication (i.e., device-to-device communications). The interface for direct device-to-device communication is referred to as PC5. The PC5 parameters may be provided by the V2X control function 146 to one or more UEs for purposes of configuring V2X communication between the UEs.

The slice management function can be used for configuring one or more network slices (e.g., 5G slices) for use by UEs or other devices within the communication architecture 100A. In some aspects, the communication architecture further includes an artificial intelligence (AI)-based resource management (AIBRM) module 160 and a blockchain traceability management (BCTM) module 162, which modules can provide functionalities in connection with dynamic slice configuration, dynamic resource management, and resource traceability within the architecture 100A.

The AIBRM module 160 may comprise suitable circuitry, logic, interfaces and/or code and can be configured to provide resource management functions. More specifically, the AIBRM module 160 can use AI-based (e.g., machine learning) techniques to dynamically assess resource usage within the architecture 100A and provide a resource allocation recommendation (e.g., to the CN 110 or the MEC platform manager 106) for dynamic allocation (or re-allocation) or computing and communication resources based on current resource usage, past resource usage, or intended (future) resource usage (e.g., based on previous dynamic slice allocations or current slice allocation requests).

The BCTM module 162 may comprise suitable circuitry, logic, interfaces and/or code and can be configured to provide resource usage traceability using blockchain techniques.

Blockchain technology offers a way to record transactions or any digital interaction that is designed to be secure, transparent, resistant to outages, auditable, and efficient. A blockchain is a digital, distributed transaction ledger that is stored and maintained on multiple systems belonging to multiple entities sharing identical information. This creates a web that shares the responsibility of storing, maintaining, and validating the information present on the blockchain. Any authorized participant can review entries and users can update information stored on the blockchain only if the network consensus algorithm validates it. Information stored in a blockchain can never be deleted and serves as a verifiable and accurate record of every transaction made within the ledger. In this regard, blockchain technology offers the following key functionalities that can be used within the architecture 100A for resource traceability and resource usage traceability: fast transaction settlement (transactions are processed directly from peer to peer with fewer intermediaries; ledgers are automatically updated; and both sides of the transaction are executed simultaneously); low cost (resources used for validating transactions are computing power which can be inexpensive; little to no reconciliation work is required and little to no use of intermediaries is required); transparent and auditable ledger (all transactions are visible to authorized participants and are traceable within the ledger); and reliable (transactions processed within the blockchain do not have a point of failure and are irrevocable).

In some aspects, the BCTM module 162 can use blockchain technology to provide traceability of user equipment slice requests, current resource usage by one or more slices, dynamic slice allocations and reallocations, as well as slice resource usage changes due to the dynamic slice allocations and reallocations.

In some aspects, resource management and traceability functions provided by the AIBRM module 160 and the BCTM module 162 can be incorporated within one or more MEC hosts (e.g., as MEC AIBRM-BCTM module 121 within MEC host 102 or module 131 within MEC host 104). In some aspects, the MEC AIBRM-BCTM module can be incorporated within the MEC platform or can be incorporated as an MEC app instantiated by the MEC platform (e.g., MEC app 116A instantiated by the MEC platform using MEC hardware 123 and 133). In some aspects, resource management and traceability functions provided by the AIBRM module 160 and the BCTM module 162 can be provided by the MEC platform manager 106, the MEC orchestrator 108, and/or other modules within the MEC communication architecture 100A.

The MEC hosts 102, . . . , 104 can be configured in accordance with the ETSI GS MEC-003 specification. The MEC host 102 can include a MEC platform 118, which can be coupled to one or more MEC applications (apps) such as MEC apps 116A, . . . , 116N (collectively, MEC app 116) and to MEC data plane 122. The MEC host 104 can include a MEC platform 126, which can be coupled to a MEC app 116 and MEC data plane 130. The MEC platform manager 106 can include a MEC platform element management module 132, MEC application rules and requirements management module 134, and MEC application lifecycle management module 136. The MEC host 102 also includes MEC hardware 123, such as network interfaces (e.g. network interface cards or NICs) 125A, . . . , 125N, one or more CPUs 127, and memory 129. Additional description of the MEC related entities 102, 104, 106, and 108 are provided hereinbelow in connection with FIG. 4.

In some aspects, the MEC apps 116A, . . . , 116N can each provide an NFV instance configured to process network connections associated with a specific network traffic type (e.g., 2G, 3G, 4G, 5G or another network traffic type). In this regard, the terms "MEC app" and "NFV" (or "MEC NFV") are used interchangeably. Additionally, the term "NFV" and "NFV instance" are used interchangeably. The MEC platform 118 can further include one or more schedulers 120A, . . . , 120N (collectively, a scheduler 120). Each of the schedulers 120A, . . . , 120N may comprise suitable circuitry, logic, interfaces, and/or code and is configured to manage instantiation of NFVs 116A, . . . , 116N (collectively, an NFV 116). More specifically, a scheduler 120 can select a CPU (e.g., one of the CPUs 127) and/or other network resources for executing/instantiating the NFV 116. Additionally, since each of the NFVs 116A, . . . , 116N is associated with processing a different network traffic type, the scheduler 120 can further select a NIC (e.g., from the available NICs 125A, . . . , 125N) for use by the NFV 116. Each of the schedulers 120A, . . . 120N can have a different type of SLA and QoS requirements, based on the network traffic type handled by the associated NFV. For example, each traffic type (e.g., 2G, 3G, 4G, 5G, or any other type of wireless connection to the MEC host) has an associated class of service (CloS) (e.g., 2G_low, 2G_mid, 2G_high, etc.) which can be preconfigured in the MEC host, defining CloS-specific resource requirements (i.e., I/O, memory, processing power, etc.) for different loads of that particular traffic type.

FIG. 1 further illustrates MEC host 104 including MEC hardware 133, MEC QoS manager 131, and schedulers 128A, . . . , 128N, which can have the same functionality as MEC hardware 123, MEC AIBRM-BCTM module 121, and schedulers 120A, . . . , 120N described in connection with MEC host 102. Even though MEC AIBRM-BCTM module 121 is illustrated as being implemented within the MEC platform 118, the present disclosure is not limited in this regard and one or more components of the MEC AIBRM-BCTM module 121 can be implemented within other modules of the MEC host 102, the MEC orchestrator 108, or the MEC platform manager 106.

Figure 2A:
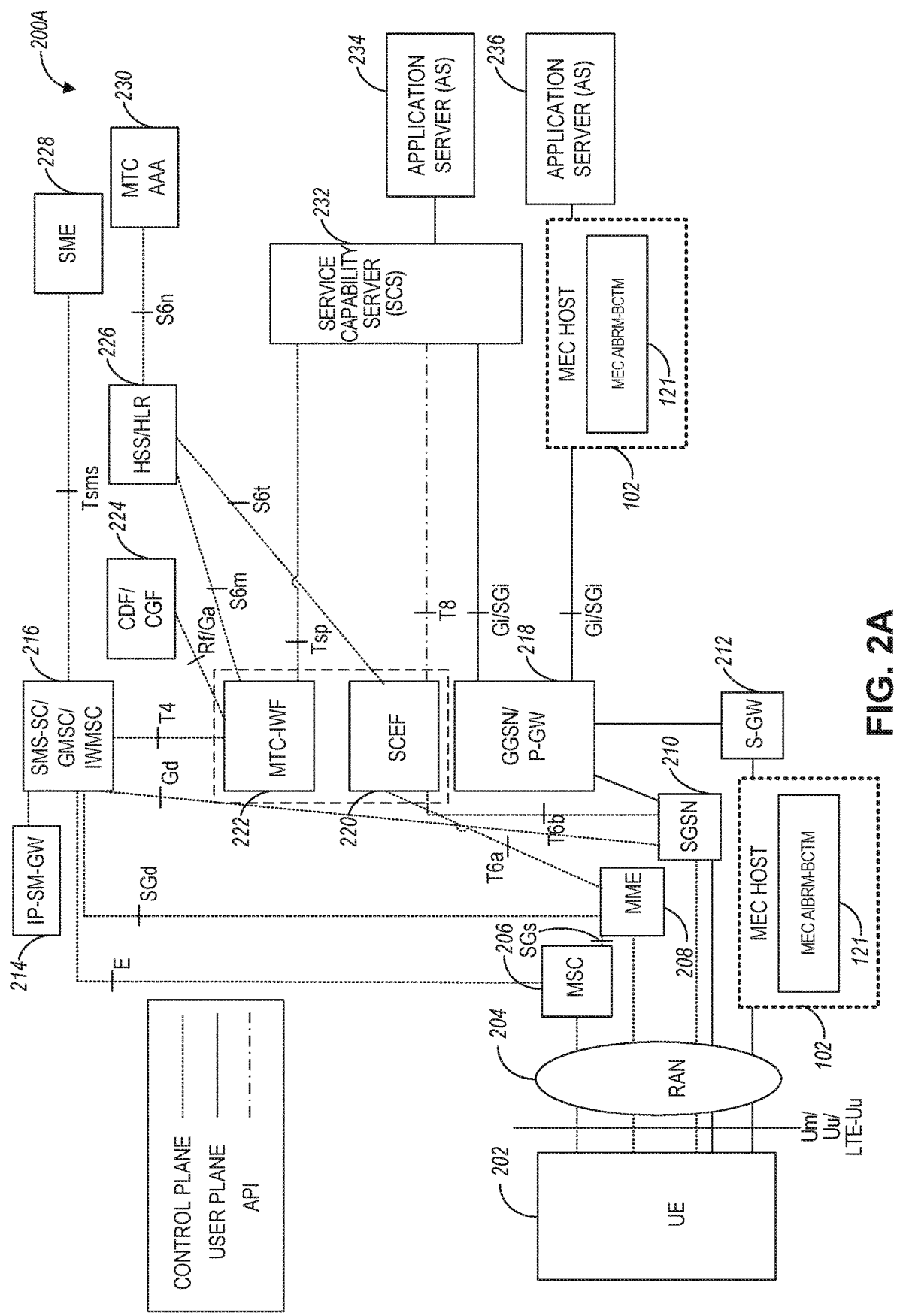
FIG. 2A illustrates an example Cellular Internet-of-Things (CIoT) network architecture with a MEC host using a MEC QoS manager, according to an example.

FIG. 2A illustrates an example Cellular Internet-of-Things (CIoT) network architecture with a MEC host using a MEC QoS manager, according to an example. Referring to FIG. 2A, the CIoT architecture 200A can include the UE 202 and the RAN 204 coupled to a plurality of core network entities. In some aspects, the UE 202 can be a machine-type communication (MTC) UE. The CIoT network architecture 200A can further include a mobile services switching center (MSC) 206, MME 208, a serving GPRS support node (SGSN) 210, a S-GW 212, an IP-Short-Message-Gateway (IP-SM-GW) 214, a Short Message Service-Service Center (SMS-SC)/gateway mobile service center (GMSC)/Interworking MSC (IWMSC) 216, MTC interworking function (MTC-IWF) 222, a Service Capability Exposure Function (SCEF) 220, a gateway GPRS support node (GGSN)/Packet-GW (P-GW) 218, a charging data function (CDF)/charging gateway function (CGF) 224, a home subscriber server (HSS)/a home location register (HLR) 226, short message entities (SME) 228, MTC authorization, authentication, and accounting (MTC AAA) server 230, a service capability server (SCS) 232, and application servers (AS) 234 and 236. In some aspects, the SCEF 220 can be configured to securely expose services and capabilities provided by various 3GPP network interfaces. The SCEF 220 can also provide means for the discovery of the exposed services and capabilities, as well as access to network capabilities through various network application programming interfaces (e.g., API interfaces to the SCS 232).

FIG. 2A further illustrates various reference points between different servers, functions, or communication nodes of the CIoT network architecture 200A. Some example reference points related to MTC-IWF 222 and SCEF 220 include the following: Tsms (a reference point used by an entity outside the 3GPP network to communicate with UEs used for MTC via SMS), Tsp (a reference point used by a SCS to communicate with the MTC-IWF related control plane signaling), T4 (a reference point used between MTC-IWF 222 and the SMS-SC 216 in the HPLMN), T6a (a reference point used between SCEF 220 and serving MME 208), T6b (a reference point used between SCEF 220 and serving SGSN 210), T8 (a reference point used between the SCEF 220 and the SCS/AS 234, 236), S6m (a reference point used by MTC-IWF 222 to interrogate HSS/HLR 226), S6n (a reference point used by MTC-AAA server 230 to interrogate HSS/HLR 226), and S6t (a reference point used between SCEF 220 and HSS/HLR 226).

In some aspects, the UE 202 can be configured to communicate with one or more entities within the CIoT architecture 200A via the RAN 204 (e.g., CIoT RAN) according to a Non-Access Stratum (NAS) protocol, and using one or more radio access configuration, such as a narrowband air interface, for example, based on one or more communication technologies, such as Orthogonal Frequency Division Multiplexing (OFDM) technology. As used herein, the term "CIoT UE" refers to a UE capable of CIoT optimizations, as part of a CIoT communications architecture. In some aspects, the NAS protocol can support a set of NAS messages for communication between the UE 202 and an Evolved Packet System (EPS) Mobile Management Entity (MME) 208 and SGSN 210. In some aspects, the CIoT network architecture 200A can include a packet data network, an operator network, or a cloud service network, having, for example, among other things, servers such as the Service Capability Server (SCS) 232, the AS 234, or one or more other external servers or network components.

The RAN 204 can be coupled to the HSS/HLR servers 226 and the AAA servers 230 using one or more reference points including, for example, an air interface based on an S6a reference point, and configured to authenticate/authorize CIoT UE 202 to access the CIoT network. The RAN 204 can be coupled to the CIoT network architecture 200A using one or more other reference points including, for example, an air interface corresponding to an SGi/Gi interface for 3GPP accesses. The RAN 204 can be coupled to the SCEF 220 using, for example, an air interface based on a T6a/T6b reference point, for service capability exposure. In some aspects, the SCEF 220 may act as an API GW towards a third-party application server such as server 234. The SCEF 220 can be coupled to the HSS/HLR 226 and MTC AAA 230 servers using an S6t reference point and can further expose an Application Programming Interface to network capabilities.

In certain examples, one or more of the CIoT devices disclosed herein, such as the UE 202, the RAN 204, etc., can include one or more other non-CIoT devices, or non-CIoT devices acting as CIoT devices, or having functions of a CIoT device. For example, the UE 202 can include a smartphone, a tablet computer, or one or more other electronic device acting as a CIoT device for a specific function, while having other additional functionality. In some aspects, the RAN 204 can include a CIoT enhanced Node B (CIoT eNB) communicatively coupled to a CIoT Access Network Gateway (CIoT GW). In certain examples, the RAN 204 can include multiple base stations (e.g., CIoT eNBs or other types of base stations) connected to the CIoT GW, which can include MSC 206, MME 208, SGSN 210, or S-GW 212. In certain examples, the internal architecture of RAN 204 and the CIoT GW may be left to the implementation and need not be standardized.

In some aspects, the CIoT architecture 200A can include one or more MEC hosts that can provide a communication link between different components of the CIoT architecture. For example, MEC host 102 can be coupled between the RAN 204 and the S-GW 212. In this case, the MEC host 102 can use one or more NFV instances to process wireless connections with the RAN 204 and the S-GW 212. The MEC host 102 can also be coupled between the P-GW 218 and the application server 236. In this case, the MEC host 102 can use the one or more NFV instances to process wireless connections originating from or terminating at the P-GW 218 and the application server 236. In some aspects, the MEC host 102 includes a MEC AIBRM-BCTM module 121, which is configured according to techniques disclosed herein to perform resource management and traceability functions.

Figure 2B:
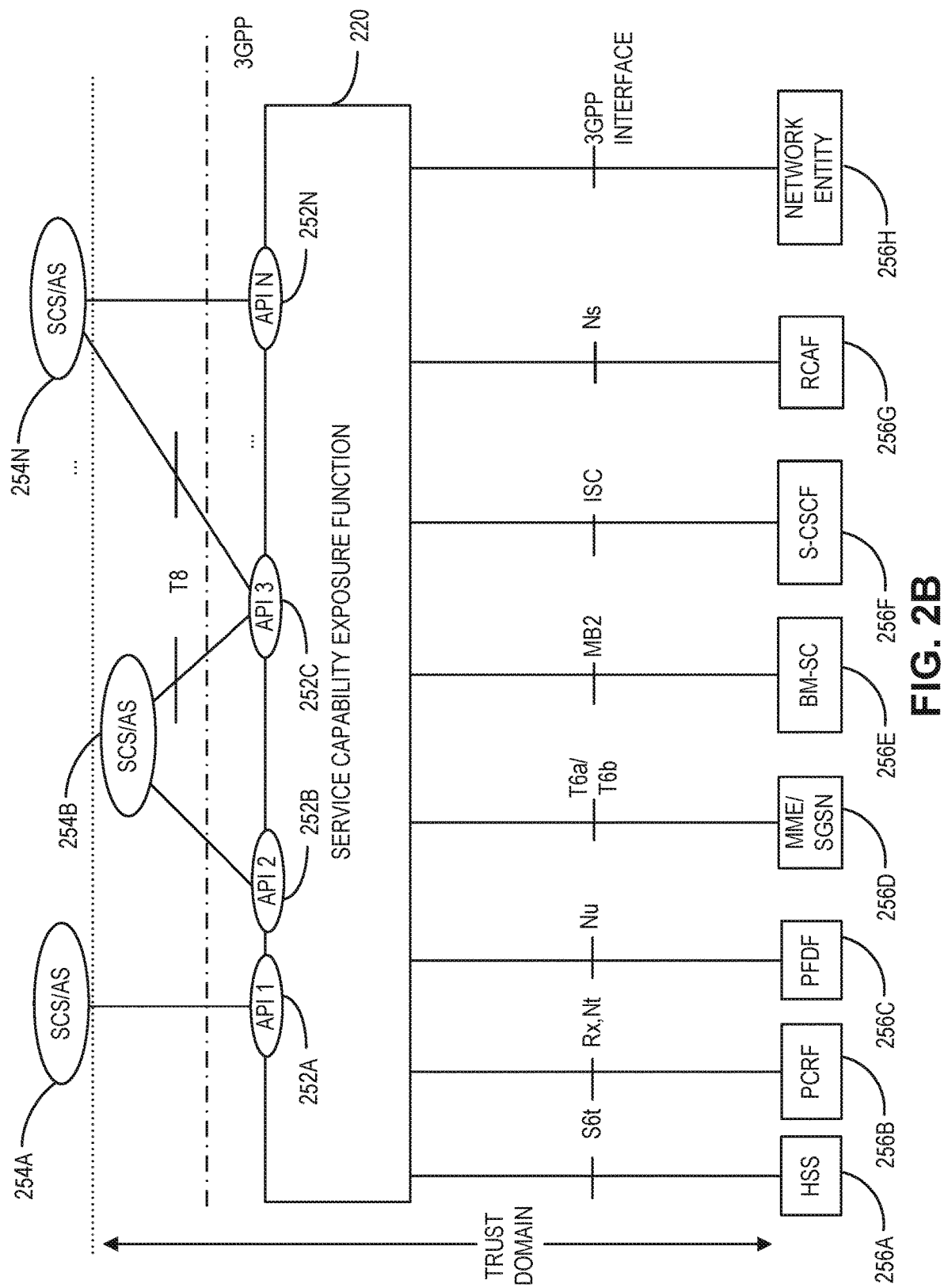
FIG. 2B illustrates an example Service Capability Exposure Function (SCEF) used by the CIoT network architecture of FIG. 2B, according to an example.

FIG. 2B illustrates an example Service Capability Exposure Function (SCEF) used by the CIoT network architecture of FIG. 2B, according to an example. Referring to FIG. 2B, the SCEF 220 can be configured to expose services and capabilities provided by 3GPP network interfaces to external third-party service provider servers hosting various applications. In some aspects, a 3GPP network such as the CIoT architecture 200A, can expose the following services and capabilities: a home subscriber server (HSS) 256A, a policy and charging rules function (PCRF) 256B, a packet flow description function (PFDF) 256C, a MME/SGSN 256D, a broadcast multicast service center (BM-SC) 256E, a serving call server control function (S-CSCF) 256F, a RAN congestion awareness function (RCAF) 256G, and one or more other network entities 256H. The above-mentioned services and capabilities of a 3GPP network can communicate with the SCEF 220 via one or more interfaces as illustrated in FIG. 2B. The SCEF 220 can be configured to expose the 3GPP network services and capabilities to one or more applications running on one or more service capability server (SCS)/application server (AS), such as SCS/AS 254A, 254B, . . . , 254N. Each of the SCS/AS 254A 254N can communicate with the SCEF 220 via application programming interfaces (APIs) 252A, 252B, 252C, . . . , 252N, as seen in FIG. 2B.

Figure 3A:
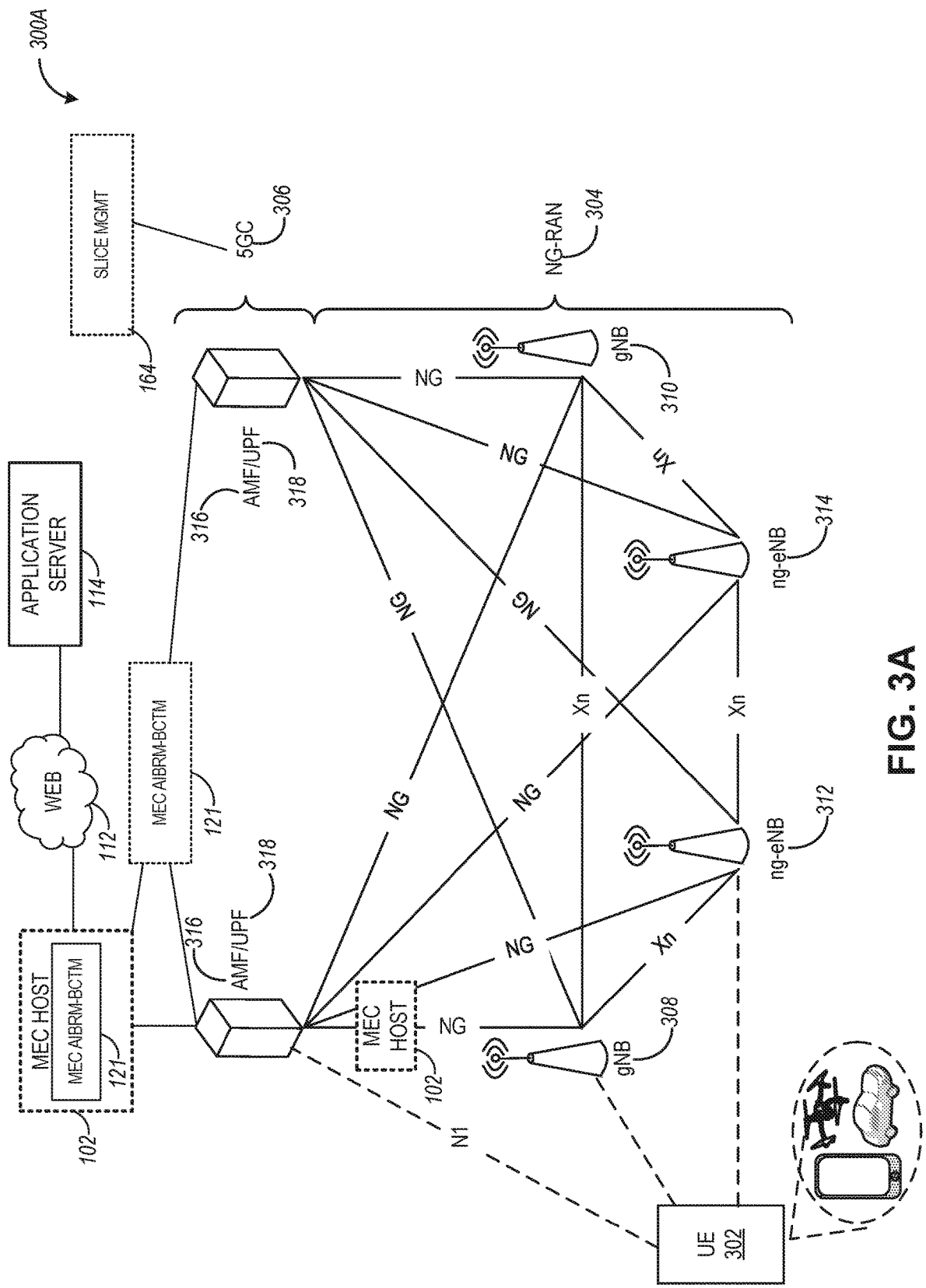
FIG. 3A is a simplified diagram of an exemplary Next-Generation (NG) system architecture with a MEC host using a MEC QoS manager, according to an example.

FIG. 3A is a simplified diagram of an exemplary Next-Generation (NG) system architecture with a MEC host using a MEC QoS manager, according to an example. Referring to FIG. 3A, the NG system architecture 300A includes NG RAN 304 and a 5G network core (5GC) 306. The NG-RAN 304 can include a plurality of NG-RAN nodes, for example, gNBs 308 and 310, and NG-eNBs 312 and 314. The gNBs 308/310 and the NG-eNBs 312/314 can be communicatively coupled to the UE 302 via a wireless connection. The core network 306 (e.g., a 5G core network or 5GC) can include an access and mobility management function (AMF) 316 or a user plane function (UPF) 318. The AMF 316 and the UPF 318 can be communicatively coupled to the gNBs 308/310 and the NG-eNBs 312/314 via NG interfaces. More specifically, in some aspects, the gNBs 308/310 and the NG eNBs 312/314 can be connected to the AMF 316 by N2 interface, and to the UPF 318 by N3 interface. The gNBs 308/310 and the NG-eNBs 312/314 can be coupled to each other via Xn interfaces.

In some aspects, a gNB 308 can include a node providing New Radio (NR) user plane and control plane protocol termination towards the UE and can be connected via the NG interface to the 5GC 306. In some aspects, an NG-eNB 312/314 can include a node providing evolved universal terrestrial radio access (E UTRA) user plane and control plane protocol terminations towards the UE and is connected via the NG interface to the 5GC 306. In some aspects, any of the gNBs 308/310 and the NG-eNBs 312/314 can be implemented as a base station (BS), a mobile edge server, a small cell, a home eNB, although aspects are not so limited.

In some aspects, the NG system architecture 300A can include one or more MEC hosts that can provide a communication link between different components of the NG architecture. For example, MEC host 102 can provide an interface between the AMF 316 (or UPF 318) in the 5GC 306 and the application server 114. The MEC host 102 can use one or more NFV instances to process wireless connections with the 5GC 306 and the application server 114. The MEC host 102 can also be coupled between one or more of the gNBs (e.g., gNB 308) and the AMF/UPF in the 5GC 306. In this case, the MEC host 102 can use the one or more NFV instances to process wireless connections originating from or terminating at the gNB 308 and the 5GC 306.

In some aspects, the MEC host 102 includes an MEC AIBRM-BCTM module 121, which is configured according to techniques disclosed herein to provide resource management and traceability functions. In some aspects, the MEC AIBRM-BCTM module 121 can be incorporated as a stand-alone server or an application running on a virtual machine, which is accessible to the 5G core 306 as well as the MEC host 102. In some aspects, the 5G core 306 can provide slice management functionalities performed by the slice management module 164, as disclosed herein.

In some aspects, the system architecture 300A (which can be the same as 100A) can be a 5G-NR system architecture providing network slicing and supporting policy configuration and enforcement between network slices as per service level agreements (SLAs) within the RAN 304 (or 204). Additionally and as illustrated in greater detail in FIG. 3E, the RAN 304 can provide separation of central unit control plane (CU-CP) and central unit user plane (CU-UP) functionalities while supporting network slicing (e.g., using resource availability and latency information communication via different RAN interfaces, such as E1, F1-C, and F1-U interfaces). In some aspects, the UE 302 (or 152) can communicate RRC signaling to the gNB 308 for establishing a connection with an entity (e.g., UPF 318) of the 5GC 306. The gNB 308 can include separate distributed units (DUs), CU-CP, and CU-UP entities (as illustrated in FIG. 3E). The CU-CP entity can obtain resource utilization and latency information from the DU and CU-UP entities and select a DU/CU-UP pair based on such information for purposes of configuring the network slice. Network slice configuration information associated with the configured network slice (including resources for use while communicating via the slice) can be provided to the UE 302 for purposes of initiating data communication with the 5GC UPF entity 318 using the network slice.

Figure 3B:
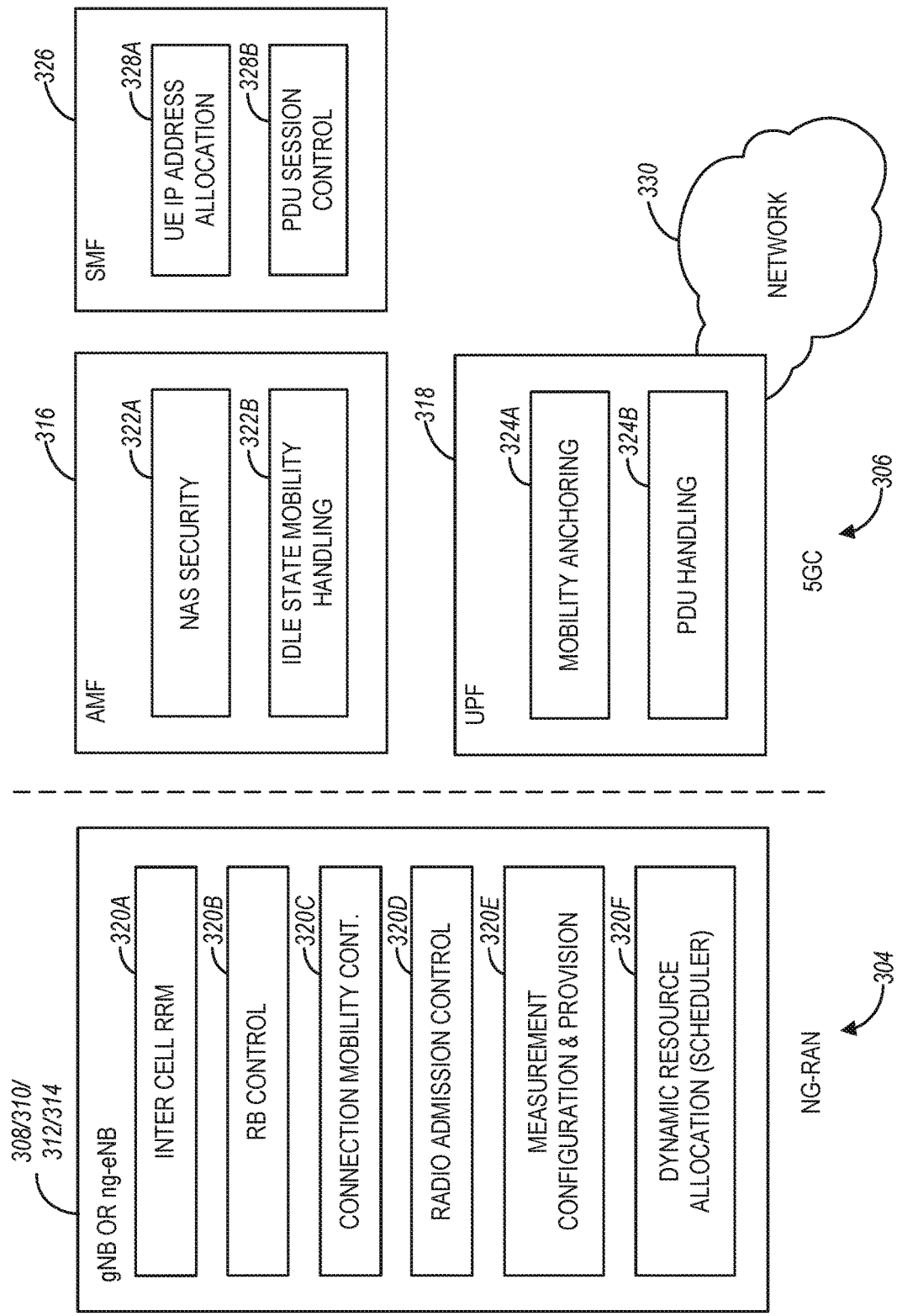
FIG. 3B illustrates an exemplary functional split between next generation radio access network (NG-RAN) and the 5G Core network (5GC) in connection with the NG system architecture of FIG. 3A, according to an example.

FIG. 3B illustrates an exemplary functional split between next generation radio access network (NG-RAN) and the 5G Core network (5GC) in connection with the NG system architecture of FIG. 3A, according to an example. FIG. 3B illustrates some of the functionalities the gNBs 308/310 and the NG-eNBs 312/314 can perform within the NG-RAN 304, as well as the AMF 316, the UPF 318, and a Session Management Function (SMF) 326 (not illustrated in FIG. 3A) within the 5GC 306. In some aspects, the 5GC 306 can provide access to a network 330 (e.g., the Internet) to one or more devices via the NG-RAN 304.

In some aspects, the gNBs 308/310 and the NG-eNBs 312/314 can be configured to host the following functions: functions for Radio Resource Management (e.g., inter-cell radio resource management 320A, radio bearer control 320B, connection mobility control 320C, radio admission control 320D, measurement and measurement reporting configuration for mobility and scheduling 320E, and dynamic allocation of resources to UEs in both uplink and downlink (scheduling) 320F); IP header compression; encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); transport level packet marking in the uplink; session management; support of network slicing; QoS flow management and mapping to data radio bearers; support of UEs in RRC_INACTIVE state; distribution function for non-access stratum (NAS) messages; radio access network sharing; dual connectivity; and tight interworking between NR and E-UTRA, to name a few.

In some aspects, the AMF 316 can be configured to host the following functions, for example: NAS signaling termination; NAS signaling security 322A; access stratum (AS) security control; inter-core network (CN) node signaling for mobility between 3GPP access networks; idle state/mode mobility handling 322B, including mobile device, such as a UE reachability (e.g., control and execution of paging retransmission); registration area management; support of intra-system and inter-system mobility; access authentication; access authorization including check of roaming rights;

mobility management control (subscription and policies); support of network slicing: or SMF selection, among other functions.

The UPF 318 can be configured to host the following functions, for example: mobility anchoring 324A (e.g., anchor point for Intra-/Inter-RAT mobility); packet data unit (PDU) handling 324B (e.g., external PDU session point of interconnect to data network); packet routing and forwarding; packet inspection and user plane part of policy rule enforcement; traffic usage reporting; uplink classifier to support routing traffic flows to a data network; branching point to support multi-homed PDU session: QoS handling for user plane, e.g., packet filtering, gating. UL/DL rate enforcement; uplink traffic verification (SDF to QoS flow mapping); or downlink packet buffering and downlink data notification triggering, among other functions.

The Session Management function (SMF) 326 can be configured to host the following functions, for example: session management; UE IP address allocation and management 328A; selection and control of user plane function (UPF); PDU session control 328B, including configuring traffic steering at UPF 318 to route traffic to proper destination; control part of policy enforcement and QoS; or downlink data notification, among other functions.

Figure 3C:
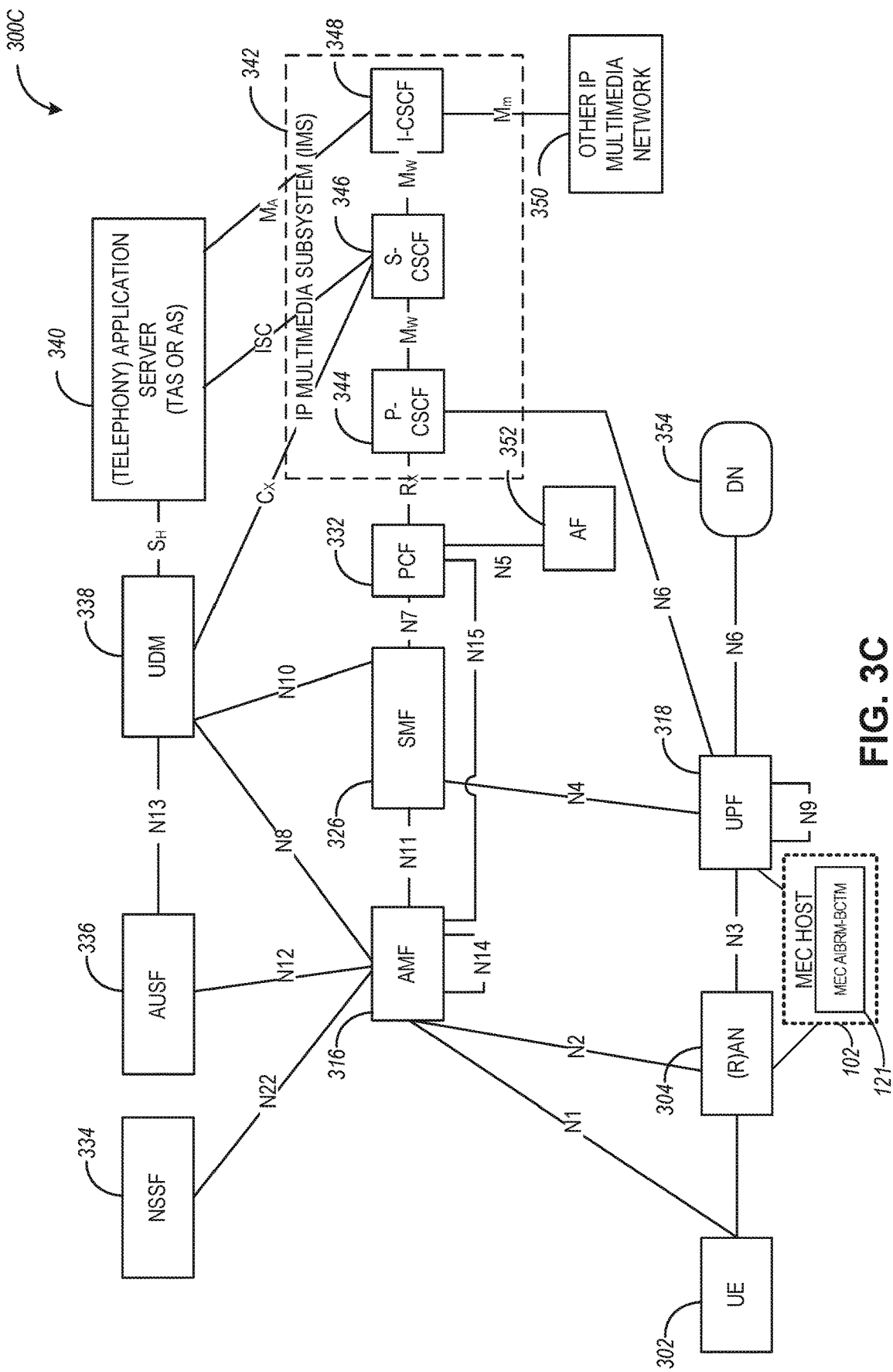
FIG. 3C and FIG. 3D illustrate non-roaming 5G system architectures with a MEC host using resource management and traceability functions, according to an example.
Figure 3D:
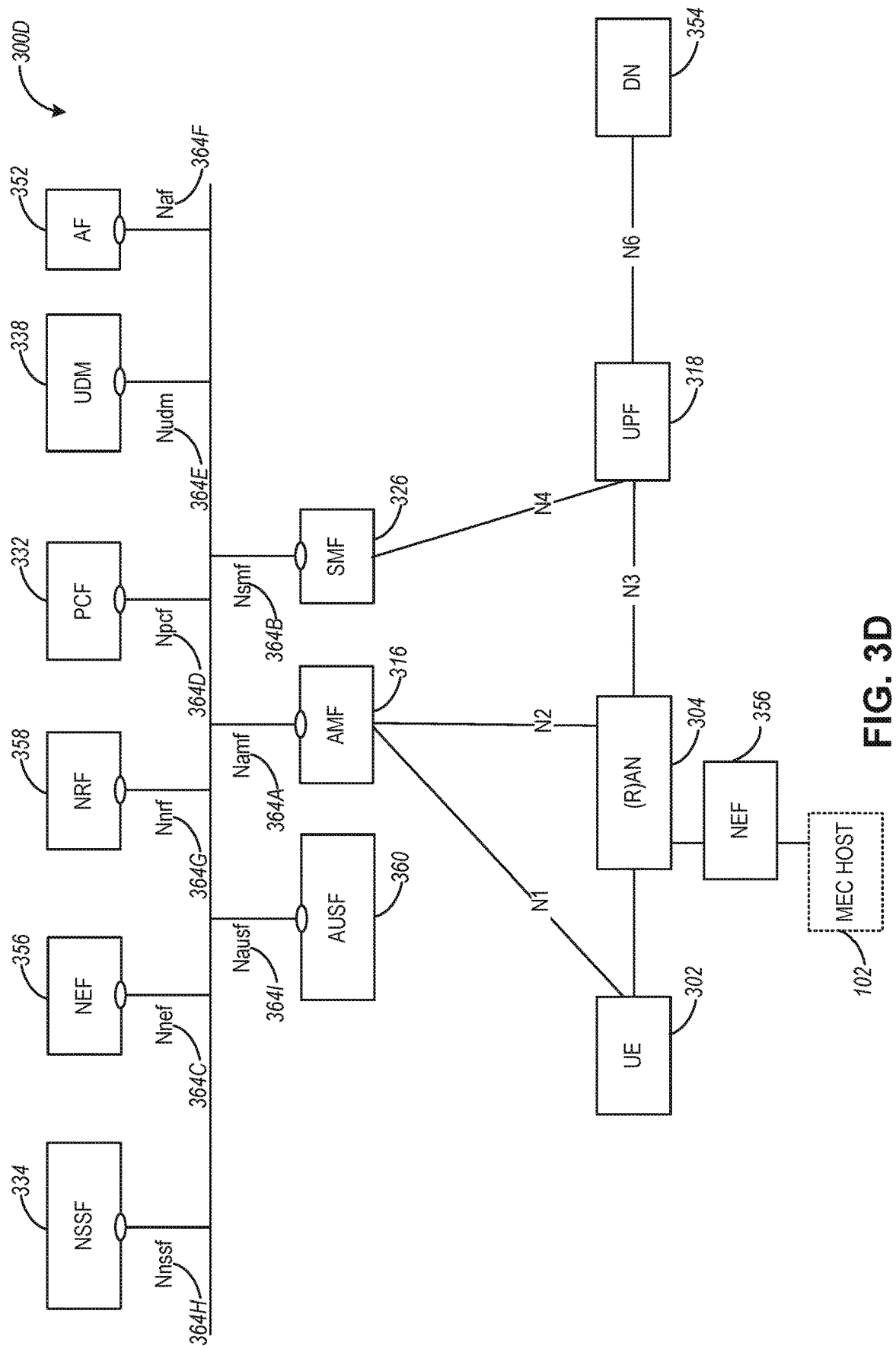
Figure 3E:
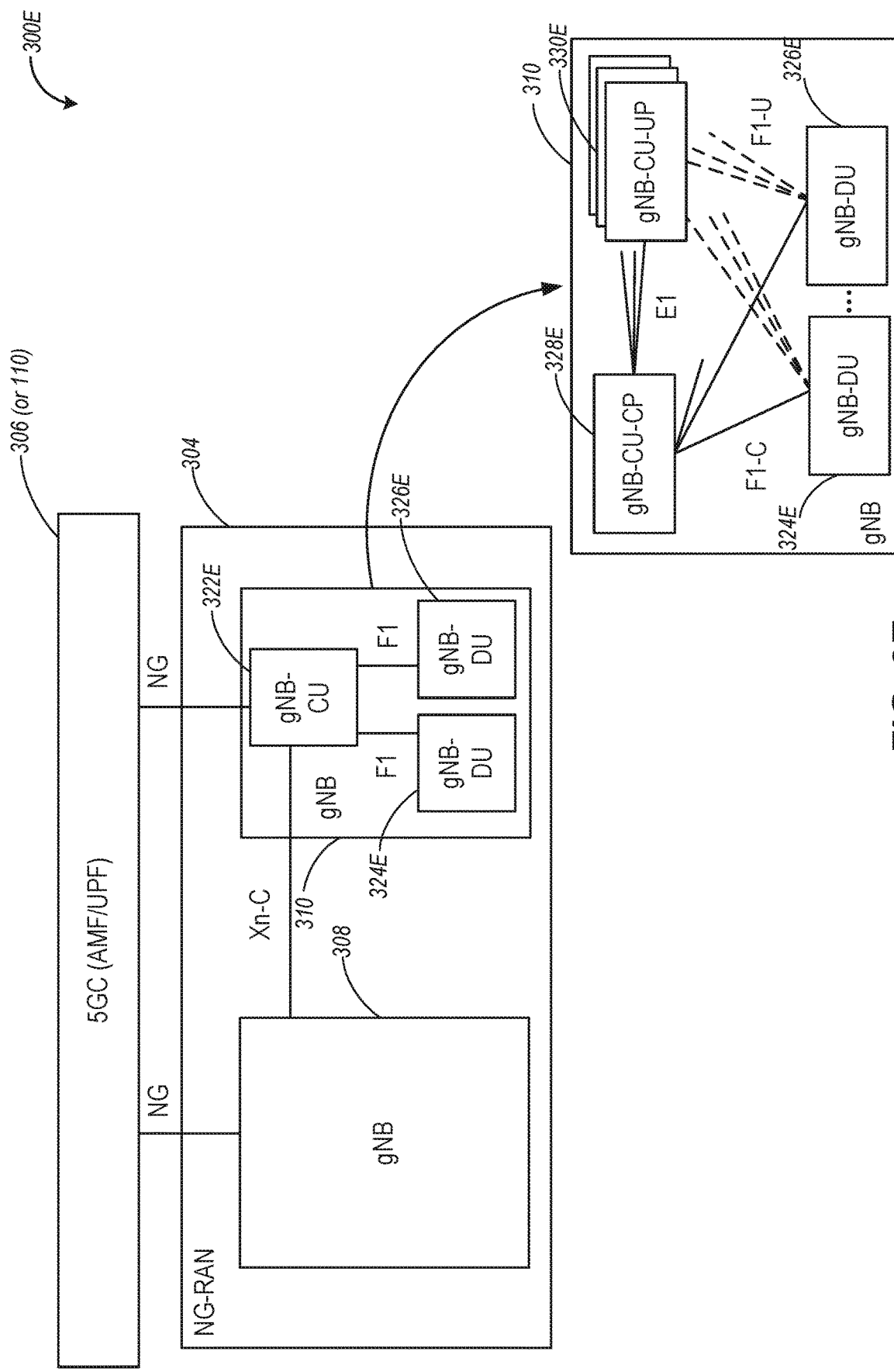
FIG. 3E illustrates components of an exemplary 5G-NR architecture with control unit control plane (CU-CP)—control unit user plane (CU-UP) separation, according to an example.

FIG. 3C and FIG. 3D illustrate exemplary non-roaming 5G system architectures with a MEC host using a MEC QoS manager, according to an example. Referring to FIG. 3C, an exemplary 5G system architecture 300C is illustrated in a reference point representation. More specifically, UE 302 can be in communication with RAN 304 as well as one or more other 5G core (5GC) network entities. The 5G system architecture 300C includes a plurality of network functions (NFs), such as access and mobility management function (AMF) 316, session management function (SMF) 326, policy control function (PCF) 332, application function (AF) 352, user plane function (UPF) 318, network slice selection function (NSSF) 334, authentication server function (AUSF) 336, and unified data management (UDM) 338.

The UPF 318 can provide a connection to a data network (DN) 354, which can include, for example, operator services, Internet access, or third-party services. The AMF 316 can be used to manage access control and mobility and can also include network slice selection functionality. The SMF 326 can be configured to set up and manage various sessions according to a network policy. The UPF 318 can be deployed in one or more configurations according to the desired service type. The PCF 332 can be configured to provide a policy framework using network slicing, mobility management, and roaming (similar to PCRF in a 4G communication system). The UDM 338 can be configured to store subscriber profiles and data (similar to an HSS in a 4G communication system), such as V2X subscription information or another type of subscription information for services available within the architecture 300C.

In some aspects, the 5G system architecture 300C includes an IP multimedia subsystem (IMS) 342 as well as a plurality of IP multimedia core network subsystem entities, such as call session control functions (CSCFs). More specifically, the IMS 342 includes a CSCF, which can act as a proxy CSCF (P CSCF) 344, a serving CSCF (S-CSCF) 346, an emergency CSCF (E-CSCF) (not illustrated in FIG. 3C), or interrogating CSCF (I-CSCF) 348. The P-CSCF 344 can be configured to be the first contact point for the UE 302 within the IMS 342. The S-CSCF 346 can be configured to handle the session states in the network, and the E-CSCF can be configured to handle certain aspects of emergency sessions such as routing an emergency request to the correct emergency center or public safety answering point (PSAP). The I-CSCF 348 can be configured to function as the contact point within an operator's network for all IMS connections destined to a subscriber of that network operator, or a roaming subscriber currently located within that network operator's service area. In some aspects, the I-CSCF 348 can be connected to another IP multimedia network 350, e.g. an IMS operated by a different network operator.

In some aspects, the UDM 338 can be coupled to an application server 340, which can include a telephony application server (TAS) or another application server (AS) including a MEC host. The AS 340 can be coupled to the IMS 342 via the S-CSCF 346 or the I-CSCF 348. In some aspects, the 5G system architecture 300C can use one or more MEC hosts to provide an interface and offload processing of wireless communication traffic. For example and as illustrated in FIG. 3C, the MEC host 102 can provide a connection between the RAN 304 and UPF 318 in the core network. The MEC host 102 can use one or more NFV instances instantiated on virtualization infrastructure within the host to process wireless connections to and from the RAN 304 and the UPF 318. Additionally, the MEC host 102 can use the MEC AIBRM-BCTM module 121 and techniques disclosed herein to manage resource management and traceability functions.

FIG. 3D illustrates an exemplary 5G system architecture 300D in a service-based representation. System architecture 300D can be substantially similar to (or the same as) system architecture 300C. In addition to the network entities illustrated in FIG. 3C, system architecture 300D can also include a network exposure function (NEF) 356 and a network repository function (NRF) 358. In some aspects, 5G system architectures can be service-based and interaction between network functions can be represented by corresponding point-to-point reference points Ni (as illustrated in FIG. 3C) or as service-based interfaces (as illustrated in FIG. 3D).

A reference point representation shows that an interaction can exist between corresponding NF services. For example, FIG. 3C illustrates the following reference points: N1 (between the UE 302 and the AMF 316), N2 (between the RAN 304 and the AMF 316), N3 (between the RAN 304 and the UPF 318), N4 (between the SMF 326 and the UPF 318), N5 (between the PCF 332 and the AF 352), N6 (between the UPF 318 and the DN 354), N7 (between the SMF 326 and the PCF 332), N8 (between the UDM 338 and the AMF 316), N9 (between two UPFs 318), N10 (between the UDM 338 and the SMF 326), N11 (between the AMF 316 and the SMF 326), N12 (between the AUSF 336 and the AMF 316), N13 (between the AUSF 336 and the UDM 338), N14 (between two AMFs 316), N15 (between the PCF 332 and the AMF 316 in case of a non-roaming scenario, or between the PCF 332 and a visited network and AMF 316 in case of a roaming scenario), N16 (between two SMFs; not shown), and N22 (between AMF 316 and NSSF 334). Other reference point representations not shown in FIG. 3C can also be used.

In some aspects, as illustrated in FIG. 3D, service-based representations can be used to represent network functions within the control plane that enable other authorized network functions to access their services. In this regard, 5G system architecture 300D can include the following service-based interfaces: Namf 364A (a service-based interface exhibited by the AMF 316), Nsmf 364B (a service-based interface exhibited by the SMF 326), Nnef 364C (a service-based interface exhibited by the NEF 356), Npcf 364D (a service-based interface exhibited by the PCF 332), Nudm 364E (a service-based interface exhibited by the UDM 338), Naf 364F (a service-based interface exhibited by the AF 352), Nnrf 364G (a service-based interface exhibited by the NRF 358), Nnssf 364H (a service-based interface exhibited by the NSSF 334), Nausf 364I (a service-based interface exhibited by the AUSF 360). Other service-based interfaces (e.g., Nudr, N5g-eir, and Nudsf) not shown in FIG. 3D can also be used.

In some aspects, the NEF 356 can provide an interface to a MEC host such as MEC host 102, which can be used to process wireless connections with the RAN 304.

FIG. 3E illustrates components of an exemplary 5G-NR architecture with control unit control plane (CU-CP)—control unit user plane (CU-UP) separation, according to an example. Referring to FIG. 3E, the 5G-NR architecture 300E can include a 5G core (5GC) 306 and NG-RAN 304. The NG-RAN 304 can include one or more gNBs such as gNB 308 and 310. In some aspects, network elements of the NG-RAN 304 may be split into central and distributed units, and different central and distributed units, or components of the central and distributed units, may be configured for performing different protocol functions (e.g., different protocol functions of the protocol layers).

In some aspects, the gNB 308 can comprise or be split into one or more of a gNB Central Unit (gNB-CU) 322E and gNB Distributed Unit(s) (gNB-DU) 324E, 326E. Additionally, the gNB 308 can comprise or be split into one or more of a gNB-CU-Control Plane (gNB-CU-CP) 328E and a gNB-CU-User Plane (gNB CU-UP) 330E. The gNB-CU 322E is a logical node configured to host the radio resource control (RRC) layer, service data adaptation protocol (SDAP) layer, and packet data convergence protocol layer (PDCP) protocols of the gNB or RRC, and PDCP protocols of the E-UTRA-NR gNB (en-gNB) that controls the operation of one or more gNB-DUs. The gNB-DU (e.g., 324E or 326E) is a logical node configured to host the radio link control layer (RLC), medium access control layer (MAC), and physical layer (PHY) layers of the gNB 128A, 128B or en-gNB, and its operation is at least partly controlled by gNB-CU 322E. In some aspects, one gNB DU (e.g., 324E) can support one or multiple cells.

The gNB-CU 322E comprises a gNB-CU-Control Plane (gNB-CU-CP) entity 328E and a gNB-CU-User Plane entity (gNB-CU-UP) 330E. The gNB-CU CP 328E is a logical node configured to host the RRC and the control plane part of the PDCP protocol of the gNB-CU 322E for an en-gNB or a gNB. The gNB-CU-UP 330E is a logical (or physical) node configured to host the user plane part of the PDCP protocol of the gNB-CU 322E for an en-gNB, and the user plane part of the PDCP protocol and the SDAP protocol of the gNB-CU 322E for a gNB.

The gNB-CU 322E and the gNB-DUs 324E, 326E can communicate via the F1 interface, and the gNB 308 can communicate with the gNB-CU 322E via the Xn-C interface. The gNB-CU-CP 328E and the gNB-CU-UP 330E can communicate via the E1 interface(s). Additionally, the gNB-CU-CP 328E and the gNB-DUs 324E, 326E can communicate via the F1-C interface, and the gNB-DUs 324E, 326E and the gNB-CU-UP 330E can communicate via the F1-U interface.

In some aspects, the gNB-CU 322E terminates the F1 interface connected with the gNB-DUs 324E, 326E, and in other aspects, the gNB-DUs 324E, 326E terminate the F1 interface connected with the gNB-CU 322E. In some aspects, the gNB-CU-CP 328E terminates the E1 interface connected with the gNB-CU-UP 330E and the F1-C interface connected with the gNB-DUs 324E, 326E. In some aspects, the gNB-CU-UP 330E terminates the E1 interface connected with the gNB-CU-CP 328E and the F1-U interface connected with the gNB-DUs 324E, 326E.

In some aspects, the F1 interface is a point-to-point interface between endpoints and supports the exchange of signaling information between endpoints and data transmission to the respective endpoints. The F1 interface can support control plane and user plane separation and separate the Radio Network Layer and the Transport Network Layer. In some aspects, the E1 interface is a point-to-point interface between a gNB-CU-CP and a gNB-CU-UP and supports the exchange of signaling information between endpoints. The E1 interface can separate the Radio Network Layer and the Transport Network Layer, and in some aspects, the E1 interface may be a control interface not used for user data forwarding.

Referring to the NG-RAN 304, the gNBs 308, 310 of the NG-RAN 304 may communicate to the 5GC 306 via the NG interfaces, and can be interconnected to other gNBs via the Xn interface. In some aspects, the gNBs 308, 310 can be configured to support FDD mode, TDD mode, or dual mode operation. In certain aspects, for EN-DC, the S1-U interface and an X2 interface (e.g., X2-C interface) for a gNB, consisting of a gNB-CU and gNB-DUs, can terminate in the gNB-CU.

In some aspects, gNB 310 supporting CP/UP separation, includes a single CU-CP entity 328E, multiple CU-UP entities 330E, and multiple DU entities 324E, . . . , 326E, with all entities being configured for network slice operation. As illustrated in FIG. 3E, each DU entity 324E, . . . , 326E can have a single connection with the CU-CP 328E via a F1-C interface. Each DU entity 324E, . . . , 326E can be connected to multiple CU-UP entities 330E using F1-U interfaces. The CU-CP entity 328E can be connected to multiple CU-UP entities 330E via E1 interfaces. Each DU entity 324E, . . . , 326E can be connected to one or more UEs, and the CU-UP entities 330E can be connected to a user plane function (UPF) and the 5G core 306.

In some aspects, entities within the gNB 310 can perform one or more procedures associated with interfaces or radio bearers within the NG-RAN 304 with the separation of CP/UP. For example, NG-RAN 304 can support the following procedures associated with network slice configuration:

E1 interface setup: this procedure allows to setup the E1 interface, and it includes the exchange of the parameters needed for interface operation. The E1 setup is initiated by the CU-CP 328E;

E1 interface reset: this procedure allows to reset the E1 interface, including changes in the configuration parameters. The E1 interface reset is initiated by either the CU-CP 328E or the CU-UP 330E;

E1 error indication: this procedure allows to report detected errors in one incoming message. The E1 interface reset is initiated by either the CU-CP 328E or the CU-UP 330E;

E1 load information: this procedure allows CU-UP 328E to inform CU-CP 328E of the prevailing load condition periodically. The same procedure could also be used to indicate overload of CU-UP 330E with overload status (Start/Stop);

E1 configuration update: this procedure supports updates in CU-UP 330E configuration, such as capacity changes;

Data Radio Bearer (DRB) setup: this procedure allows the CU-CP 328E to setup DRBs in the CU-CP, including the security key configuration and the quality of service (QoS) flow to DRB mapping configuration;

DRB modification: this procedure allows the CU-CP 328E to modify DRBs in the CU-CP, including the modification of security key configuration and the modification of the QoS flow to DRB mapping configuration;

DRB release: this procedure allows the CU-CP 328E to release DRBs in the CU-CP; and Downlink Data Notification (DDN): This procedure allows CU-UP 330E to request CU-CP 328E to trigger paging procedure to support RRC Inactive state.

In some aspects, the NG-RAN 304 can be configured to support E1 interface management procedures for network slicing including resource availability indication from the CU-UP 330E, resource management in CU-UP 330E, and latency indication from the CU-UP 330E.

In some aspects, the NG-RAN 304 can be configured to support F1-C interface management procedures for network slicing including resource availability indication from the DU entities 324E, . . . 326E, the resource management in the DU entities 324E, . . . , 326E, and latency indication from the DU entities 324E, . . . , 326E.

In some aspects, the NG-RAN 304 can be configured to support latency measurements over the F1-U interface so that the UP elements including DU entities (324E, . . . , 326E) and CU-UP entities 330E are able to communicate latency information to other neighboring UP elements. In this regard, network slicing can be supported in the NG-RAN 304 with the separation of CP/UP. In some aspects, slice-level isolation and the improved resource utilization can be provided by the central RRM in the CU-CP 328E.

In some aspects, procedures associated with network slicing include operations and communications over the E1 interface, the F1-C interface, and the F1-U interface. With these procedures, the CU-CP 328E can select the appropriate DU and CU-UP entities to serve the specific network slicing request associated with a certain service level agreement (SLA).

In some aspects, the procedure over the E1 interface can include information collection from the CU-UP entities 330E and resource management in the CU-CP 328E. Specifically, the information collection can include resource availability indication and latency indication, while the resource management can include resource allocation and resource release. The CU-CP 328E can be configured to collect the information from the CU-UP entities 330E periodically or issue an on-demanding query based on a network slice request. In some aspects, a resource availability indication procedure can allow the CU-UP entities 330E to inform the CU-CP 328E of the availability of resources to process a network slicing request. For example, the indication of the available resource can assist the CU-CP 328E to determine whether the specific CU-UP can serve the specific network slice requesting associated with a certain SLA.

In some aspects, a resource allocation procedure can allow the CU-CP 328E to allocate the resource in the CU-UP 330E that is associated with a specific slice. Upon the reception of a request for a network slice creation, the CLU-CP 328E can select the CU-UP 330E (e.g., one of the CU-UP entities) following the indicated SLA and allocate the resource in the selected CU-UP to the network slice. In some aspects, a resource release procedure can allow the CU-CP 328E to release the resource in the CU-UP that is assigned to an established network slice. Upon the removal of the slice, the CU-CP 328E can notify the corresponding CU-UP to release the resource used by the removed network slice.

Figure 4:
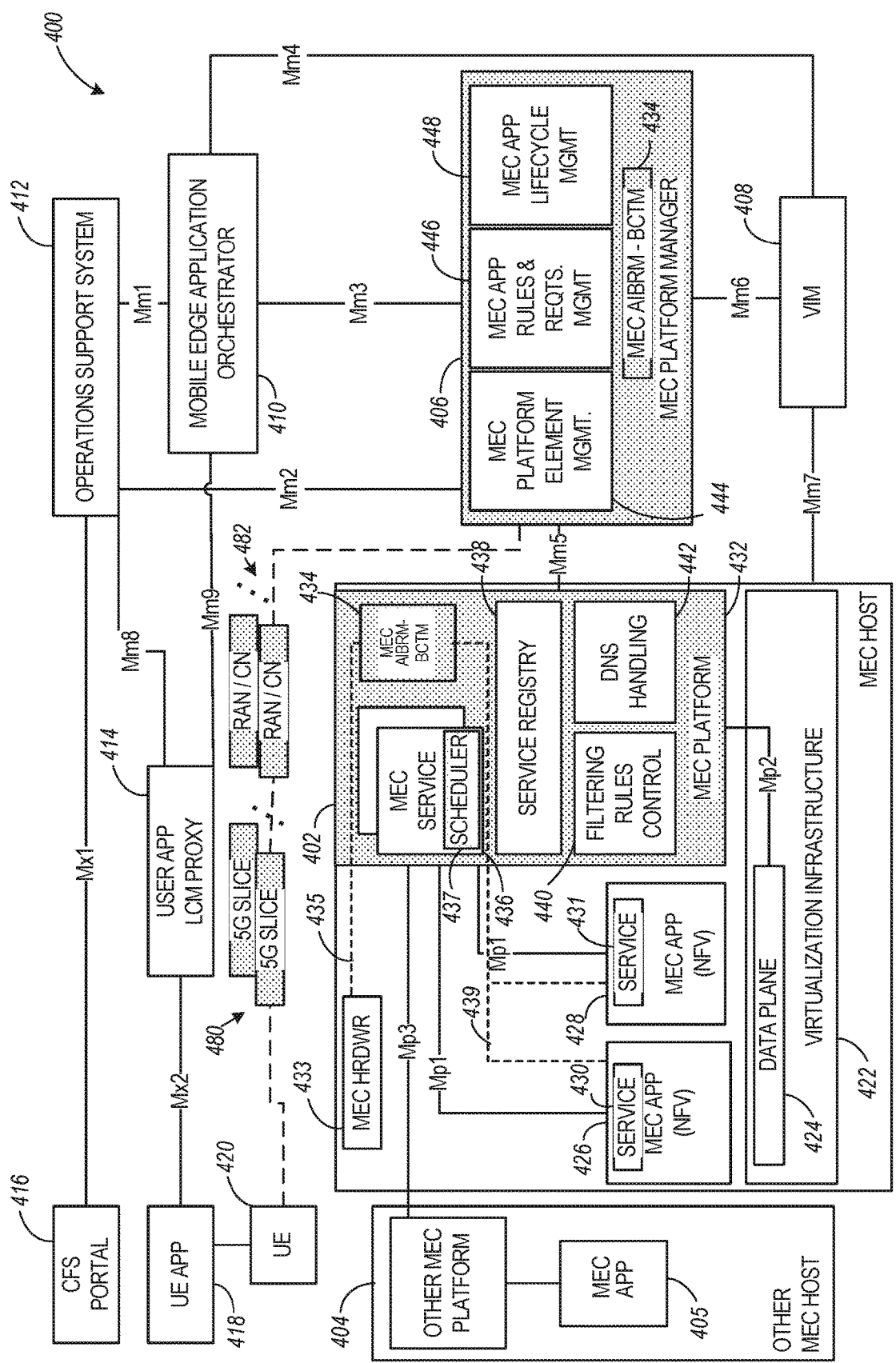
FIG. 4 illustrates a MEC network architecture modified for supporting slice management, resource management, and traceability functions, according to an example.

FIG. 4 illustrates a MEC network architecture 400 modified for supporting slice management, resource management, and traceability functions, according to an example. FIG. 4 specifically illustrates a MEC architecture 400 with MEC hosts 402 and 404 providing functionalities in accordance with the ETSI GS MEC-003 specification, with the shaded blocks used to indicate processing aspects for the MEC architecture configuration described herein in connection with slice management, resource management, and traceability functions. Specifically, enhancements to the MEC platform 432 and the MEC platform manager 406 may be used for providing slice management, resource management, and traceability functions within the MEC architecture 400. This may include provisioning of one or more network slices, dynamic management of resources used by the network slices, as well as resource traceability functions within the MEC architecture.

Referring to FIG. 4, the MEC network architecture 400 can include MEC hosts 402 and 404, a virtualization infrastructure manager (VIM) 408, an MEC platform manager 406, an MEC orchestrator 410, an operations support system 412, a user app proxy 414, a UE app 418 running on UE 420, and CFS portal 416. The MEC host 402 can include a MEC platform 432 with filtering rules control module 440, a DNS handling module 442, service registry 438, and MEC services 436. The MEC services 436 can include at least one scheduler 437, which can be used to select resources for instantiating MEC apps (or NFVs) 426 and 428 upon virtualization infrastructure 422. The MEC apps 426 and 428 can be configured to provide services 430/431, which can include processing network communications traffic of different types associated with one or more wireless connections (e.g., connections to one or more RAN or core network entities as illustrated in FIGS. 1-3D). The MEC hardware 433 and the at least one scheduler 437 can be similar to the MEC hardware 123 and the scheduler 120 discussed in connection with FIG. 1.

The MEC platform manager 406 can include MEC platform element management module 444, MEC app rules and requirements management module 446, and MEC app lifecycle management module 448. The various entities within the MEC architecture 400 can perform functionalities as disclosed by the ETSI GS MEC-003 specification.

In some aspects, UE 420 can be configured to communicate to one or more of the core networks 482 via one or more of the network slices 480. In some aspects, the core networks 482 can use slice management functions (e.g., as provided by slice management module 164) to dynamically configure slices 480, including dynamically assign a slice to a UE, reassign a slice to a UE, dynamically allocate or reallocate resources used by one or more of the slices 480, or other slice related management functions. One or more of the functions performed in connection with slice management can be initiated based on user requests (e.g., via a UE) or request by a service provider. In some aspects, the slice management functions in connection with network slices 480 can be facilitated by AIBRM and BCTM resource management and traceability related functions (provided by, e.g., MEC AIBRM-BCTM module 434 within the MEC host 402 or the MEC platform manager 406). Additional aspects of network dimensioning/segmenting/slicing and resource management use cases are illustrated in connection with FIG. 11, FIG. 12, FIG. 13, and FIG. 14.

Figure 5:
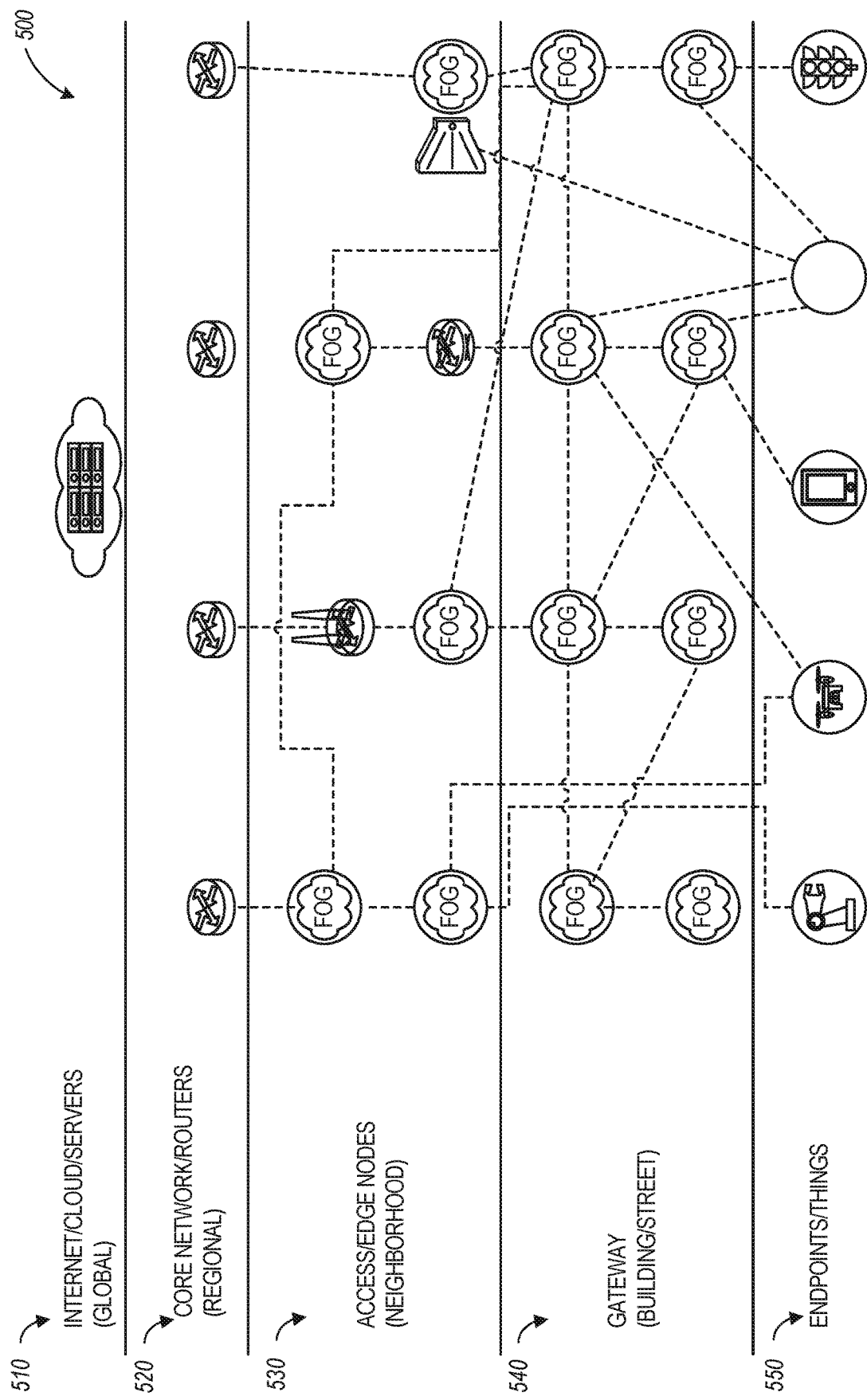
FIG. 5 illustrates a MEC and FOG network topology, according to an example.

FIG. 5 illustrates a MEC and FOG network topology 500, according to an example. Referring to FIG. 5, the network topology 500 can include a number of conventional networking layers, that can be extended through the use of a MEC QoS manager discussed herein. Specifically, the relationships between endpoints (at endpoints/things network layer 550), gateways (at gateway layer 540), access or edge computing nodes (e.g., at neighborhood nodes layer 530), core network or routers (e.g., at regional or central office layer 520), may be represented through the use of data communicated via MEC hosts that use MEC QoS managers that can be located at various nodes within the topology 500.

A FOG network (e.g., established at gateway layer 540) may represent a dense geographical distribution of near-user edge devices (e.g., FOG nodes), equipped with storage capabilities (e.g., to avoid the need to store data in cloud data centers), communication capabilities (e.g., rather than routed over the internet backbone), control capabilities, configuration capabilities, measurement and management capabilities (rather than controlled primarily by network gateways such as those in the LTE core network), among others. In this context, FIG. 5 illustrates a general architecture that integrates a number of MEC and FOG nodes— categorized in different layers (based on their position, connectivity and processing capabilities, etc.), with each node implementing a MEC V2X API that can enable a MEC app or other entity of a MEC enabled node to communicate with other nodes. It will be understood, however, that such FOG nodes may be replaced or augmented by edge computing processing nodes.

FOG nodes may be categorized depending on the topology and the layer where they are located. In contrast, from a MEC standard perspective, each FOG node may be considered as a MEC host, or a simple entity hosting a MEC app and a light-weighted MEC platform.

In an example, a MEC or FOG node may be defined as an application instance, connected to or running on a device (MEC host) that is hosting a MEC platform. Here, the application consumes MEC services and is associated with a MEC host in the system. The nodes may be migrated, associated with different MEC hosts, or consume MEC services from other (e.g., local or remote) MEC platforms.

In contrast to this approach, traditional V2V applications are reliant on remote cloud data storage and processing to exchange and coordinate information. A cloud data arrangement allows for long-term data collection and storage but is not optimal for highly time-varying data, such as a collision, traffic light change, etc. and may fail in attempting to meet latency challenges, such as stopping a vehicle when a child runs into the street.

In some aspects, the MEC or FOG facilities can be used to locally create, maintain, and destroy MEC or FOG nodes to host data exchanged via NFVs and using resources managed by a MEC QoS manager, based upon need. Depending on the real-time requirements in a vehicular communications context, a hierarchical structure of data processing and storage nodes can be defined. For example, including local ultra-low-latency processing, regional storage, and processing as well as remote cloud data-center based storage and processing. Key Performance Indicators (KPIs) may be used to identify where sensor data is best transferred and where it is processed or stored. This typically depends on the ISO layer dependency of the data. For example, the lower layer (PHY, MAC, routing, etc.) data typically changes quickly and is better handled locally in order to meet latency requirements. Higher layer data such as Application Layer data is typically less time critical and may be stored and processed in a remote cloud data-center. In some aspects, the KPIs are metrics or operational parameters that can include spatial proximity to a V2X-related target event (e.g., accident, etc.); physical proximity to other objects (e.g., how much time is required to transfer data from one data or application object to another object); available processing power; or current load of the target (network) node and corresponding processing latency. In some aspects, the KPIs can be used to facilitate automated location and relocation of data in a MEC architecture.

Figure 6:
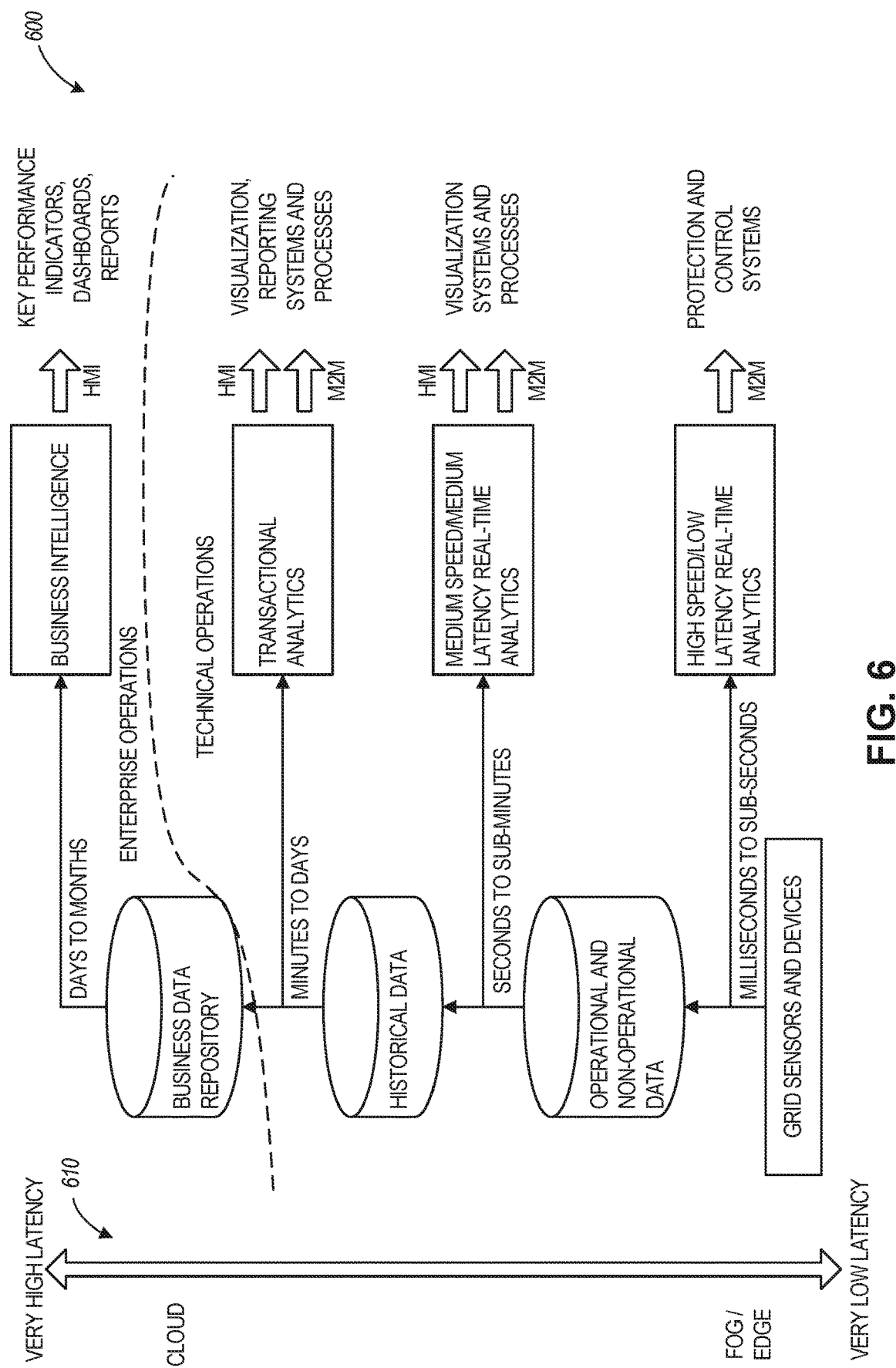
FIG. 6 illustrates the processing and storage layers in a MEC and FOG network, according to an example.

FIG. 6 illustrates the processing and storage layers in a MEC and FOG network 600, according to an example. The illustrated data storage or processing hierarchy 610 relative to the cloud and fog/edge networks allows dynamic reconfiguration of elements to meet latency and data processing parameters.

The lowest hierarchy level is on a vehicle-level. This level stores data on past observations or data obtained from other vehicles. The second hierarchy level is distributed storage across a number of vehicles. This distributed storage may change on short notice depending on vehicle proximity to each other or a target location (e.g., near an accident). The third hierarchy level is in a local anchor point, such as a MEC component, carried by a vehicle in order to coordinate vehicles in a pool of cars. The fourth level of the hierarchy is storage shared across MEC components. For example, data is shared between distinct pools of vehicles that are in the range of each other.

The fifth level of the hierarchy is fixed infrastructure storage, such as in road side units (RSUs). This level may aggregate data from entities in hierarchy levels 1-4. The sixth level of the hierarchy is storage across the fixed infrastructure. This level may, for example, be located in the Core Network of a telecommunications network, or an enterprise cloud. Other types of layers and layer processing may follow from this example.

Even though techniques disclosed herein for network slicing, service dimensioning, and resource management are discussed in connection with MEC-related architectures where at least one MEC entity is present, the disclosure is not limited in this regard and the disclosed techniques may be used in architectures that do not use MEC entities. Thus, techniques associated with network slicing, service dimensioning, and resource management can be performed in non-MEC architectures as well. Likewise, although techniques disclosed herein are described in connection with a MEC architecture and 5G architecture, the disclosure is not limited in this regard and the disclosed techniques can be used with other types of wireless architectures (e.g., 2G, 3G, 4G, etc.) that use one or more MEC entities.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard). Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), etc.

Aspects described herein can be used in the context of any spectrum management scheme including a dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan). 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (e.g., having near-global designation for Multi-Gigabit Wireless Systems (MGWS)/WiGig; in US (FCC part 15) allocated as total 14 GHz spectrum, while EU (ETSI EN 302 567 and ETSI EN 301 217-2 for fixed P2P) allocated as total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz), where particularly the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme by, e.g., introducing a hierarchical prioritization of usage for different types of users (e.g., low/medium/high priority, etc.), based on a prioritized access to the spectrum e.g. with the highest priority to tier-1 users, followed by tier-2, then tier-3 users, and so forth.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources. Some of the features in this document are defined for the network side, such as Access Points, eNodeBs, New Radio (NR) or next generation NodeBs (gNodeB or gNB), such as used in the context of 3GPP fifth generation (5G) communication systems, etc. Still, a User Equipment (UE) may take this role as well and act as an Access Points, eNodeBs, gNodeBs, etc. Accordingly, some or all features defined for network equipment may be implemented by a UE or a mobile computing device.

Figure 7:
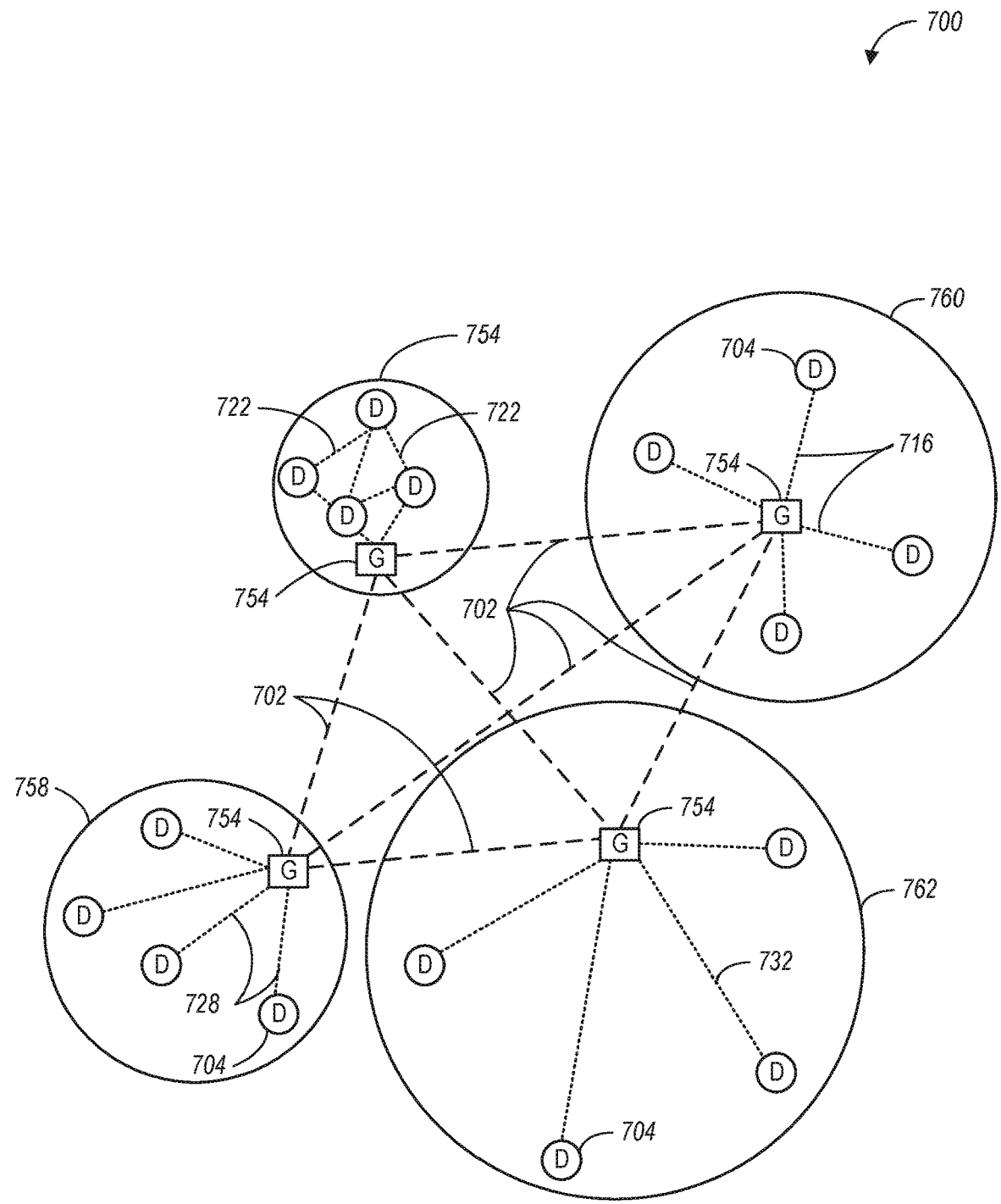
FIG. 7 illustrates a domain topology for respective Internet-of-Things (IoT) networks coupled through links to respective gateways, according to an example.

In further examples, the preceding examples of network communications and operations may be integrated with IoT and like device-based network architectures. FIG. 7 illustrates an example domain topology for respective IoT networks coupled through links to respective gateways. The IoT is a concept in which a large number of computing devices are interconnected to each other and to the Internet to provide functionality and data acquisition at very low levels. Thus, as used herein, an Edge/IoT processing device may include a semi-autonomous device performing a function, such as sensing or control, among others, in communication with other Edge/IoT processing devices and a wider network, such as the Internet.

MEC use cases have been envisioned to integrate into a number of network and application settings, including those to support network arrangements of IoT deployments. Edge/IoT processing devices are physical or virtualized objects that may communicate on a network (typically at the edge or endpoint of a network) and may include sensors, actuators, and other input/output components, such as to collect data or perform actions from a real-world environment. For example, Edge/IoT processing devices may include low-powered devices that are embedded or attached to everyday things, such as buildings, vehicles, packages, etc., to provide sensing, data, or processing functionality. Recently, Edge/IoT processing devices have become more popular and thus applications and use cases using these devices have proliferated.

Often, Edge/IoT processing devices are limited in memory, size, or functionality, enabling larger numbers to be deployed for a similar cost to smaller numbers of larger devices. However, an Edge/IoT processing device may be a smartphone, laptop, tablet, PC, or other larger device. Further, an Edge/IoT processing device may be a virtual device, such as an application on a smartphone or another computing device. Edge/IoT processing devices may include IoT gateways, used to couple Edge/IoT processing devices to other Edge/IoT processing devices and to cloud applications, for data storage, process control, and the like.

Networks of Edge/IoT processing devices may include commercial and home automation devices, such as water distribution systems, electric power distribution systems, pipeline control systems, plant control systems, light switches, thermostats, locks, cameras, alarms, motion sensors, and the like. The Edge/IoT processing devices may be accessible through remote computers, servers, and other systems, for example, to control systems or access data.

The future growth of the Internet and like networks may involve very large numbers of Edge/IoT processing devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of Edge/IoT processing devices and networks present a number of new challenges in a heterogeneous network of connectivity comprising a combination of wired and wireless technologies.

FIG. 7 specifically provides a simplified drawing of a domain topology that may be used for a number of IoT networks comprising Edge/IoT processing devices 704, with the IoT networks 756, 758, 760, 762, coupled through backbone links 702 to respective gateways 754. For example, a number of Edge/IoT processing devices 704 may communicate with a gateway 754, and with each other through the gateway 754. To simplify the drawing, not every Edge/IoT processing device 704, or communications link (e.g., link 716, 722, 728, or 732) is labeled. The backbone links 702 may include any number of wired or wireless technologies, including optical networks, and may be part of a local area network (LAN), a wide area network (WAN), or the Internet. Additionally, such communication links facilitate optical signal paths among both Edge/IoT processing devices 704 and gateways 754, including the use of MUXing/deMUXing components that facilitate interconnection of the various devices.

The network topology may include any number of types of IoT networks, such as a mesh network provided with the network 756 using Bluetooth low energy (BLE) links 722. Other types of IoT networks that may be present include a wireless local area network (WLAN) network 758 used to communicate with Edge/IoT processing devices 704 through IEEE 802.11 (Wi-Fi®) links 728, a cellular network 760 used to communicate with Edge/IoT processing devices 704 through an LTE/LTE-A (4G) or 5G cellular network, and a low-power wide area (LPWA) network 762, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with the use of a variety of network and internet application protocols such as Constrained Application Protocol (CoAP). The respective IoT networks may also be integrated with coordinator devices that provide a chain of links that form the cluster tree of linked devices and networks.

Each of these IoT networks may provide opportunities for new technical features, such as those as described herein. The improved technologies and networks may enable the exponential growth of devices and networks, including the use of IoT networks into fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between Edge/IoT processing devices 704, such as over the backbone links 702, may be protected by a decentralized system for authentication, authorization, and accounting (AAA). In a decentralized AAA system, distributed payment, credit, audit, authorization, and authentication systems may be implemented across the interconnected heterogeneous network infrastructure. This enables systems and networks to move towards autonomous operations. In these types of autonomous operations, machines may even contract for human resources and negotiate partnerships with other machine networks. This may enable the achievement of mutual objectives and balanced service delivery against outlined, planned service level agreements as well as achieve solutions that provide metering, measurements, traceability, and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the Edge/IoT processing devices. The integration of sensory systems may enable systematic and autonomous communication and coordination of service delivery against contractual service objectives, orchestration and QoS-based swarming and fusion of resources. Some of the individual examples of network-based resource processing include the following.

The mesh network 756, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource-based trust and service indices may be inserted to improve the data integrity, quality, assurance and deliver a metric of data confidence.

The WLAN network 758, for instance, may use systems that perform standards conversion to provide multi-standard connectivity, enabling Edge/IoT processing devices 704 using different protocols to communicate. Further systems may provide seamless interconnectivity across a multi-standard infrastructure comprising visible Internet resources and hidden Internet resources.

Communications in the cellular network 760, for instance, may be enhanced by systems that offload data, extend communications to more remote devices, or both. The LPWA network 762 may include systems that perform non-Internet protocol (IP) to IP interconnections, addressing, and routing. Further, each of the Edge/IoT processing devices 704 may include the appropriate transceiver for wide area communications with that device. Further, each Edge/IoT processing device 704 may include other transceivers for communications using additional protocols and frequencies. This is discussed further with respect to the communication environment and hardware of an IoT processing device depicted in FIG. 9 and FIG. 10.

Finally, clusters of Edge/IoT processing devices may be equipped to communicate with other Edge/IoT processing devices as well as with a cloud network. This may enable the Edge/IoT processing devices to form an ad-hoc network between the devices, enabling them to function as a single device, which may be termed a fog device, fog platform, or fog network. This configuration is discussed further with respect to FIG. 8 below.

Figure 8:
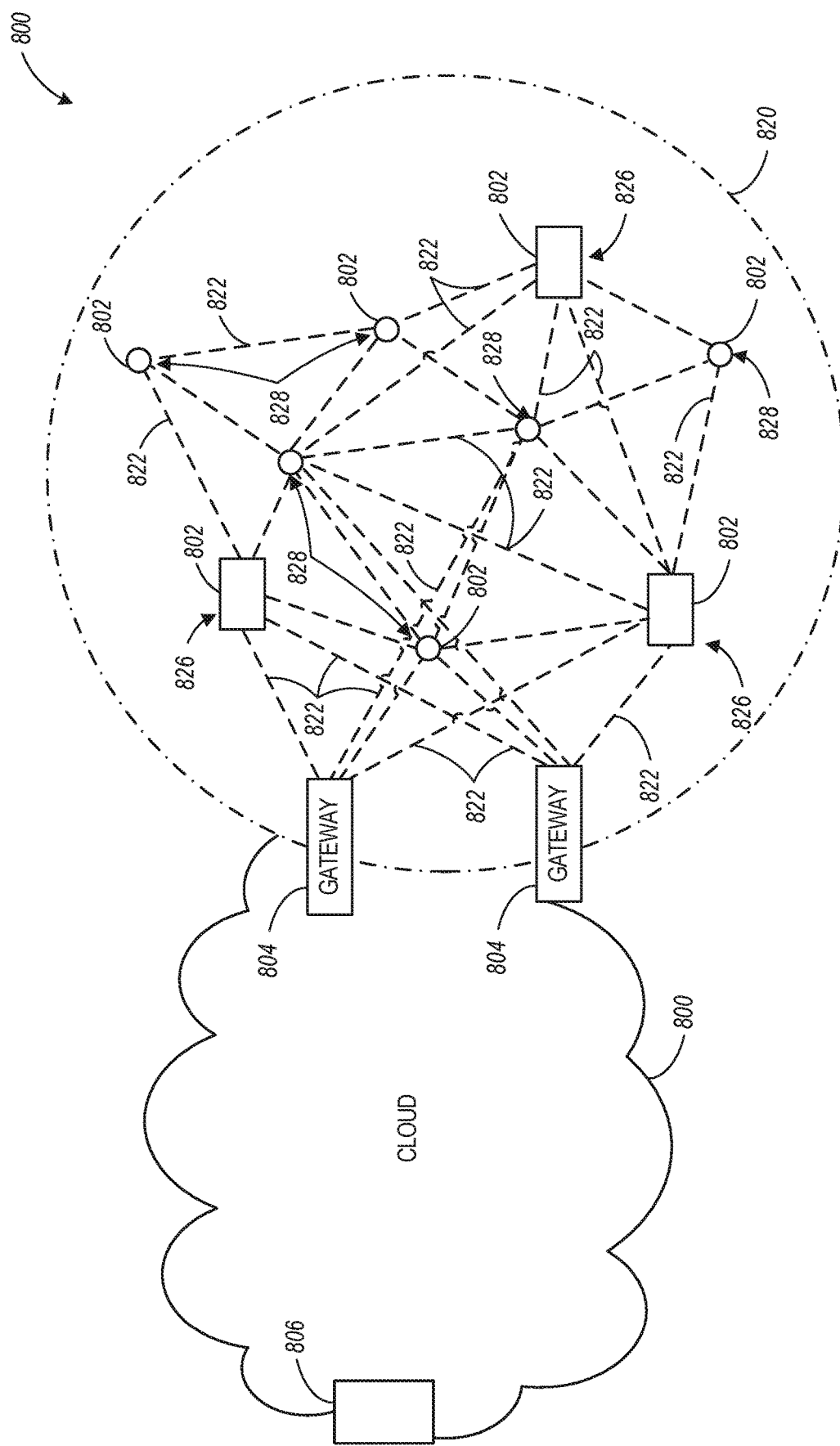
FIG. 8 illustrates a cloud-computing network in communication with a mesh network of Edge/IoT processing devices operating as fog devices at the edge of the cloud computing network, according to an example.

FIG. 8 illustrates a cloud-computing network in communication with a mesh network of Edge/IoT processing devices (devices 802) operating as fog devices at the edge of the cloud computing network, according to an example. The mesh network of Edge/IoT processing devices may be termed a fog network 820, established from a network of devices operating at the edge of the cloud 800. To simplify the diagram, not every Edge/IoT processing device 802 is labeled.

The fog network 820 may be considered to be a massively interconnected network wherein a number of Edge/IoT processing devices 802 are in communications with each other, for example, by radio links 822. The fog network 820 may establish a horizontal, physical, or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge", "fog", and "cloud" are not necessarily discrete or exclusive of one another.

As an example, the fog network 820 may be facilitated using an interconnect specification released by the Open Connectivity Foundation™ (OCF). This standard enables devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of Edge/IoT processing devices 802 are shown in this example, gateways 804, data aggregators 826, and sensors 828, although any combinations of Edge/IoT processing devices 802 and functionality may be used. The gateways 804 may be edge devices that provide communications between the cloud 800 and the fog 820 and may also provide the backend process function for data obtained from sensors 828, such as motion data, flow data, temperature data, and the like. The data aggregators 826 may collect data from any number of the sensors 828 and perform the back-end processing function for the analysis. The results, raw data, or both may be passed along to the cloud 800 through the gateways 804. The sensors 828 may be full Edge/IoT processing devices 802, for example, capable of both collecting data and processing the data. In some cases, the sensors 828 may be more limited in functionality, for example, collecting the data and enabling the data aggregators 826 or gateways 804 to process the data.

Communications from any of the Edge/IoT processing devices 802 may be passed along a convenient path (e.g., a most convenient path) between any of the Edge/IoT processing devices 802 to reach the gateways 804. In these networks, the number of interconnections provides substantial redundancy, enabling communications to be maintained, even with the loss of a number of Edge/IoT processing devices 802. Further, the use of a mesh network may enable Edge/IoT processing devices 802 that are very low power or located at a distance from infrastructure to be used, as the range to connect to another Edge/IoT processing devices 802 may be much less than the range to connect to the gateways 804.

The fog 820 provided from these Edge/IoT processing devices 802 may be presented to devices in the cloud 800, such as a server 806, as a single device located at the edge of the cloud 800, e.g., a fog device. In this example, the alerts coming from the Fog device may be sent without being identified as coming from a specific Edge/IoT processing devices 802 within the fog 820. In this fashion, the fog 820 may be considered a distributed platform that provides computing and storage resources to perform processing or data-intensive tasks such as data analytics, data aggregation, and machine learning, among others.

In some examples, the Edge/IoT processing devices 802 may be configured using an imperative programming style, e.g., with each Edge/IoT processing devices 802 having a specific function and communication partners. However, the Edge/IoT processing devices 802 forming the fog device may be configured in a declarative programming style, enabling the Edge/IoT processing devices 802 to reconfigure their operations and communications, such as to determine needed resources in response to conditions, queries, and device failures. As an example, a query from a user located at a server 806 about the operations of a subset of equipment monitored by the Edge/IoT processing devices 802 may result in the fog 820 device selecting the Edge/IoT processing devices 802, such as particular sensors 828, needed to answer the query. The data from these sensors 828 may then be aggregated and analyzed by any combination of the sensors 828, data aggregators 826, or gateways 804, before being sent on by the fog 820 device to the server 806 to answer the query. In this example, Edge/IoT processing devices 802 in the fog 820 may select the sensors 828 used based on the query, such as adding data from flow sensors or temperature sensors. Further, if some of the Edge/IoT processing devices 802 are not operational, other Edge/IoT processing devices 802 in the fog 820 device may provide analogous data, if available.

In other examples, the operations and functionality described above may be embodied by an Edge/IoT processing device machine in the example form of an electronic processing system, within which a set or sequence of instructions may be executed to cause the electronic processing system to perform any one of the methodologies discussed herein, according to an example embodiment. The machine may be an Edge/IoT processing device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine.

Further, these and like examples to a processor-based system shall be taken to include any set of one or more machines that are controlled by or operated by a processor, set of processors, or processing circuitry (e.g., a machine in the form of a computer, UE, MEC processing device, IoT processing device, etc.) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 9:
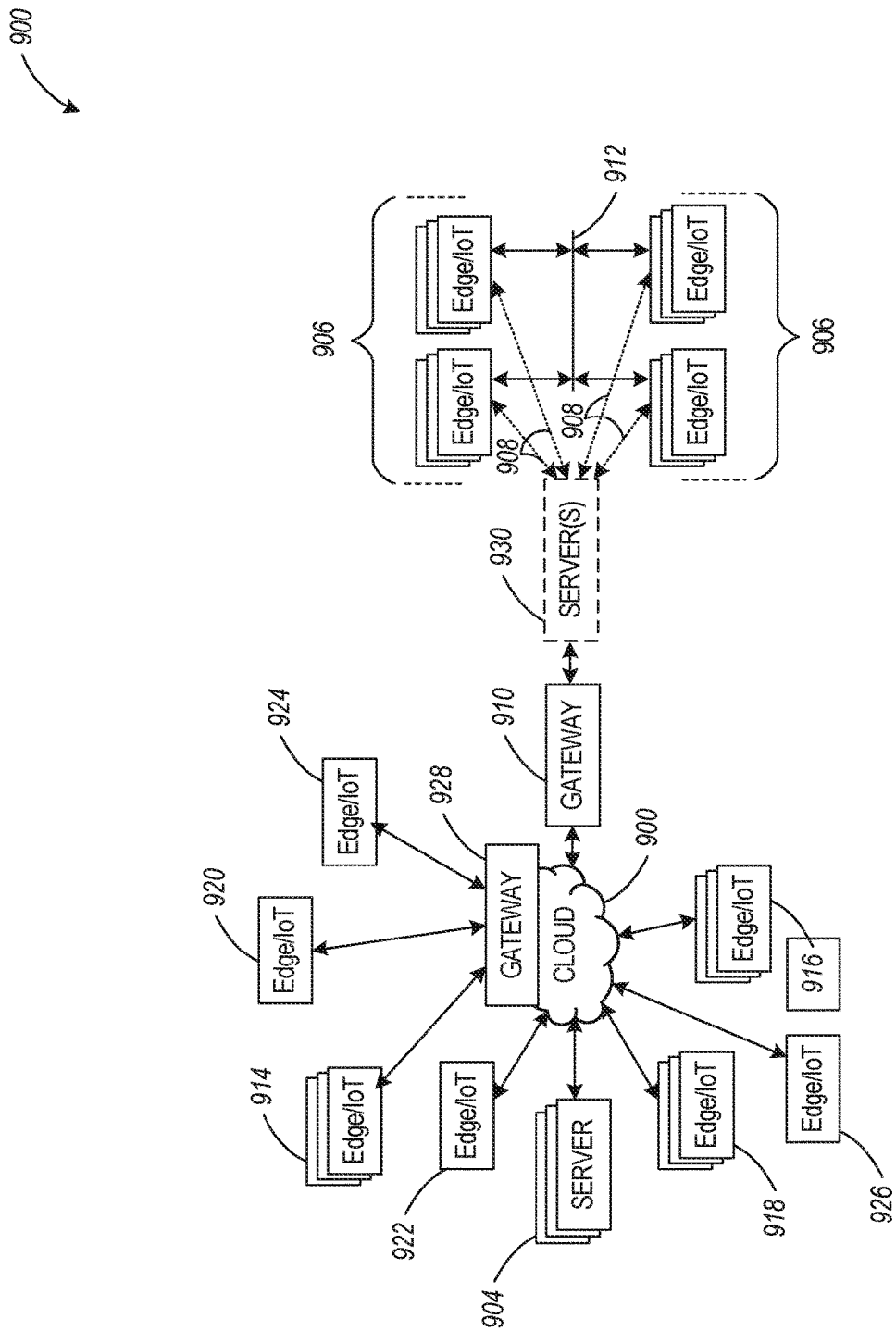
FIG. 9 illustrates a block diagram of a cloud computing network in communication with a number of Edge/IoT processing devices, according to an example.

FIG. 9 illustrates a block diagram of a cloud computing network, or cloud 900, in communication with a number of Edge/IoT processing devices, according to an example. The cloud computing network (or "cloud") 900 may represent the Internet or may be a local area network (LAN), or a wide area network (WAN), such as a proprietary network for a company. The Edge/IoT processing devices may include any number of different types of devices, grouped in various combinations. For example, a traffic control group 906 may include Edge/IoT processing devices along streets in a city. These Edge/IoT processing devices may include stoplights, traffic flow monitors, cameras, weather sensors, and the like. The traffic control group 906, or other subgroups, may be in communication with the cloud 900 through wired or wireless links 908, such as LPWA links, optical links, and the like. Further, a wired or wireless sub-network 912 may allow the Edge/IoT processing devices to communicate with each other, such as through a local area network, a wireless local area network, and the like. The Edge/IoT processing devices may use another device, such as a gateway 910 or 928 to communicate with remote locations such as the cloud 900; the Edge/IoT processing devices may also use one or more servers 930 to facilitate communication with the cloud 900 or with the gateway 910. For example, the one or more servers 930 may operate as an intermediate network node to support a local edge cloud or fog implementation among a local area network. Further, the gateway 928 that is depicted may operate in a cloud-to-gateway-to-many edge devices configuration, such as with the various Edge/IoT processing devices 914, 920, 924 being constrained or dynamic to an assignment and use of resources in the cloud 900.

Other example groups of Edge/IoT processing devices may include remote weather stations 914, local information terminals 916, alarm systems 918, automated teller machines 920, alarm panels 922, or moving vehicles, such as emergency vehicles 924 or other vehicles 926, among many others. Each of these Edge/IoT processing devices may be in communication with other Edge/IoT processing devices, with servers 904, with another IoT fog platform or system, or a combination therein. The groups of Edge/IoT processing devices may be deployed in various residential, commercial, and industrial settings (including in both private or public environments).

As may be seen from FIG. 9, a large number of Edge/IoT processing devices may be communicating through the cloud 900. This may allow different Edge/IoT processing devices to request or provide information to other devices autonomously. For example, a group of Edge/IoT processing devices (e.g., the traffic control group 906) may request a current weather forecast from a group of remote weather stations 914, which may provide the forecast without human intervention. Further, an emergency vehicle 924 may be alerted by an automated teller machine 920 that a burglary is in progress. As the emergency vehicle 924 proceeds towards the automated teller machine 920, it may access the traffic control group 906 to request clearance to the location, for example, by lights turning red to block cross traffic at an intersection insufficient time for the emergency vehicle 924 to have unimpeded access to the intersection.

Clusters of Edge/IoT processing devices, such as the remote weather stations 914 or the traffic control group 906, may be equipped to communicate with other Edge/IoT processing devices as well as with the cloud 900. This may allow the Edge/IoT processing devices to form an ad-hoc network between the devices, allowing them to function as a single device, which may be termed a fog platform or system (e.g., as described above with reference to FIG. 8).

Figure 10:
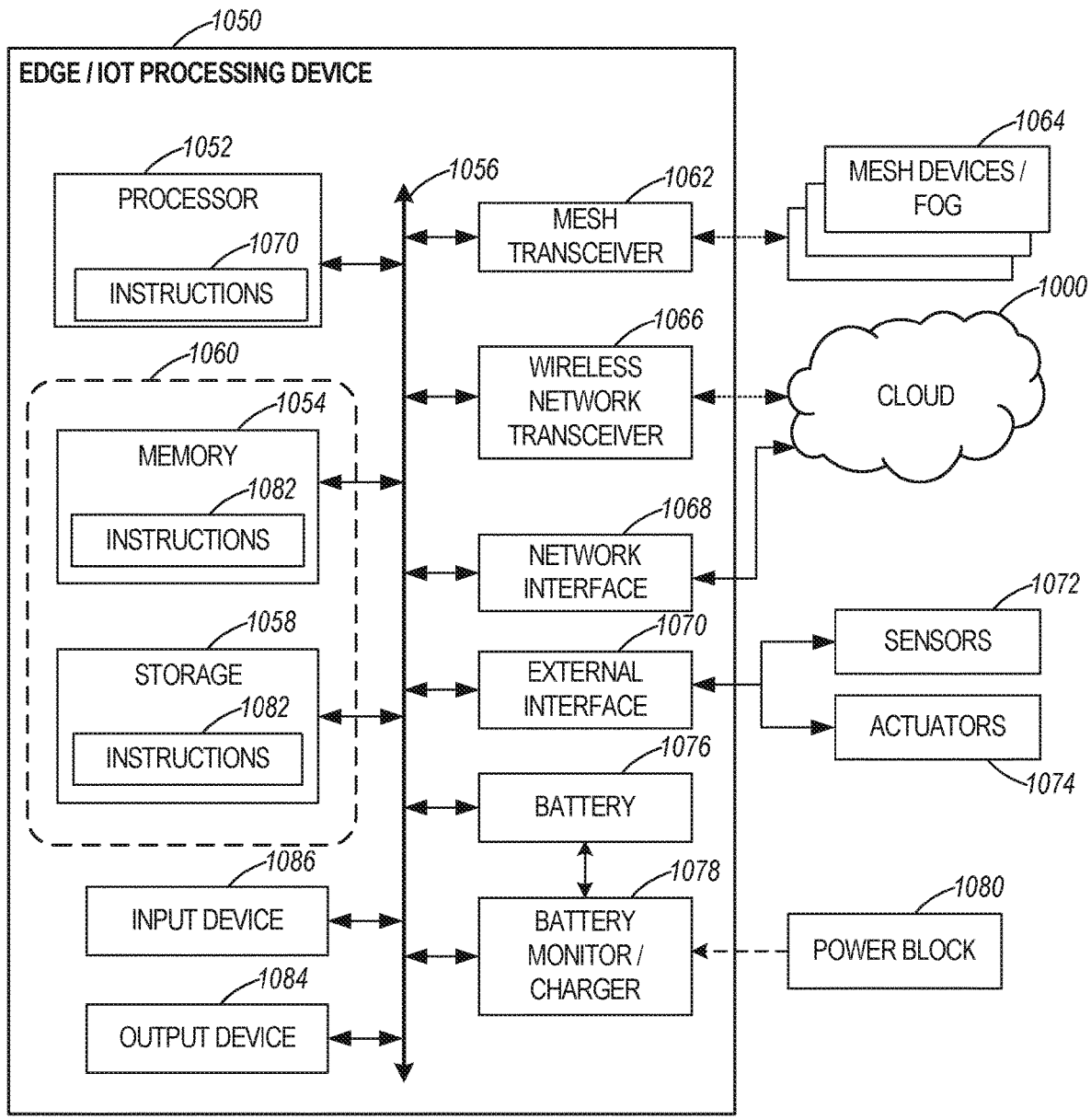
FIG. 10 is a block diagram of an example of components that may be present in an Edge/IoT processing device for implementing the techniques (e.g., operations, processes, methods, and methodologies) described herein, according to an example.

FIG. 10 is a block diagram of an example of components that may be present in an Edge/IoT processing device 1050 for implementing the techniques (e.g., operations, processes, methods, and methodologies) described herein. The Edge/IoT processing device 1050 may include any combinations of the components shown in the example or referenced in the disclosure above, and it may include any device usable with an Edge/Fog/IoT communication network or a combination of such networks. The components may be implemented as ICs, portions thereof, discrete electronic devices, or other modules, logic, hardware, software, firmware, or a combination thereof adapted in the Edge/IoT processing device 1050, or as components otherwise incorporated within a chassis of a larger system. Additionally, the block diagram of FIG. 10 is intended to depict a high-level view of components of the Edge/IoT processing device 1050. However, some of the components shown may be omitted, additional components may be present, and a different arrangement of the components shown may occur in other implementations.

The Edge/IoT processing device 1050 may include processing circuitry in the form of a processor 1052, which may be a microprocessor, a multi-core processor, a multithreaded processor, an ultra-low voltage processor, an embedded processor, or other known processing elements. The processor 1052 may be a part of a system on a chip (SoC) in which the processor 1052 and other components are formed into a single integrated circuit, or a single package, such as the Edison™ or Galileo™ SoC boards from Intel. As an example, the processor 1052 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or a customer thereof, or their licensees or adopters. The processors may include units such as an A5-A12 processor from Apple® Inc., a Snapdragon™ processor from Qualcomm® Technologies, Inc., or an OMAP™ processor from Texas Instruments, Inc.

The processor 1052 may communicate with a system memory 1054 over an interconnect 1056 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example, the storage 1058 may be implemented via a solid-state disk drive (SSDD). Other devices that may be used for the storage 1058 include flash memory cards, such as SD cards, microSD cards, XD picture cards, and the like, and USB flash drives. In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in a SoC based system. Other bus systems may be included, such as an I2C interface, an SPI interface, point to point interfaces, and a power bus, among others.

The interconnect 1056 may couple the processor 1052 to a mesh transceiver 1062, for communications with other mesh devices 1064. The mesh transceiver 1062 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1064. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1062 may communicate using multiple standards or radios for communications at a different range. For example, the Edge/IoT processing device 1050 may communicate with close devices, e.g., within about 10 meters, using a local transceiver based on BLE, or another low power radio, to save power. More distant mesh devices 1064, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee.

A wireless network transceiver 1066 may be included to communicate with devices or services in the cloud 1000 via local or wide area network protocols. The wireless network transceiver 1066 may be an LPWA transceiver that follows the IEEE 802.15.4, or IEEE 802.15.4g standards, among others. The Edge/IoT processing device 1050 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1062 and wireless network transceiver 1066, as described herein. For example, the radio transceivers 1062 and 1066 may include an LTE or another cellular transceiver that uses spread spectrum (SPA/SAS) communications for implementing high-speed communications. Further, any number of other protocols may be used, such as Wi-Fi® networks for medium speed communications and provision of network communications.

The radio transceivers 1062 and 1066 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology. In addition to the standards listed above, any number of satellite uplink technologies may be used for the wireless network transceiver 1066, including, for example, radios compliant with standards issued by the ITU (international Telecommunication Union), or the ETSI (European Telecommunications Standards Institute), among others. The examples provided herein are thus understood as being applicable to various other communication technologies, both existing and not yet formulated.

A network interface controller (NIC) 1068 may be included to provide a wired communication to the cloud 1000 or to other devices, such as the mesh devices 1064. The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1068 may be included to enable connecting to a second network, for example, a NIC 1068 providing communications to the cloud over Ethernet, and a second NIC 1068 providing communications to other devices over another type of network.

Given the variety of types of applicable communications from the device to another component or network, applicable communications circuitry used by the device may include or be embodied by any one or more of components 1062, 1066, 1068, or 1070. Accordingly, in various examples, applicable means for communicating (e.g., receiving, transmitting, etc.) may be embodied by such communications circuitry.

The interconnect 1056 may couple the processor 1052 to an external interface 1070 that is used to connect external devices or subsystems. The external devices may include sensors 1072, such as accelerometers, level sensors, flow sensors, optical light sensors, camera sensors, temperature sensors, a global positioning system (GPS) sensors, pressure sensors, barometric pressure sensors, and the like. The external interface 1070 further may be used to connect the Edge/IoT processing device 1050 to actuators 1074, such as power switches, valve actuators, an audible sound generator, a visual warning device, and the like.

In some optional examples, various input/output (I/O) devices may be present within or connected to, the Edge/IoT processing device 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the Edge/IoT processing device 1050.

A battery 1076 may power the Edge/IoT processing device 1050, although, in examples in which the Edge/IoT processing device 1050 is mounted in a fixed location, it may have a power supply coupled to an electrical grid. The battery 1076 may be a lithium ion battery, or a metal-air battery, such as a zinc-air battery, an aluminum-air battery, a lithium-air battery, and the like.

A battery monitor/charger 1078 may be included in the Edge/IoT processing device 1050 to track the state of charge (SoCh) of the battery 1076. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1078 may communicate the information on the battery 1076 to the processor 1052 over the interconnect 1056. The battery monitor/charger 1078 may also include an analog-to-digital (ADC) converter that enables the processor 1052 to directly monitor the voltage of the battery 1076 or the current flow from the battery 1076. The battery parameters may be used to determine actions that the Edge/IoT processing device 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the Edge/IoT processing device 1050. A wireless battery charging circuit, such as an LTC4020 chip from Linear Technologies of Milpitas, Calif., among others, may be included in the battery monitor/charger 1078. The specific charging circuits may be selected based on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 1082 provided via the memory 1054, the storage 1058, or the processor 1052 may be embodied as a non-transitory, machine-readable medium 1060 including code to direct the processor 1052 to perform electronic operations in the Edge/IoT processing device 1050. The processor 1052 may access the non-transitory, machine-readable medium 1060 over the interconnect 1056. For instance, the non-transitory, machine-readable medium 1060 may be embodied by devices described for the storage 1058 or may include specific storage units such as optical disks, flash drives, or any number of other hardware devices.

The non-transitory, machine-readable medium 1060 may include instructions to direct the processor 1052 to perform a specific sequence or flow of actions, for example, as described with respect to the flowchart(s) and block diagram(s) of operations and functionality depicted above. As used in, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

In some aspects, the present disclosure provides methods and configurations of automatic segmenting of applications and or software in order to place applications distributed on different devices, whether such devices are part of client, infrastructure, or cloud settings. Rather than an emphasis on orchestration, the following methods and configuration provide dimensioning of the application itself, automatically dimensioning with results in different granularity of modules. Such dimensioning will be extremely important for 5G and Edge computing use cases, because many applications do not (or cannot) take into account the network conditions or environment provided by 5G and Edge computing concepts.

The following methods and configurations may enable an improved customer deployment for many types of legacy or new apps, while still supporting development and use of cloud applications. In particular, the use of dimensioning enables an appropriate placement of app development to be offered from end to end. In prior approaches, an application owner or developer would need to change code, in a non-static fashion, which would not take into account different degrees of dimensioning or segmenting. Thus, such prior approaches did not fully consider account resource availability, cost structures, and the time required to change and validate for each different scenario.

The following methods and configurations also support the end to end deployment of hardware products and platforms, due to the flexible use cases for processors and other components that is introduced by dimensioning. The methods and configuration also support the use of dimensioning as a service, which enables different cloud providers, software vendors, and network operators who are interested some software to have the software written once and dimensioned based on time of day, cost of placement, and time of use. Technical benefits of these methods and configurations include, among others, include power saving, efficiencies of code for different locations, time, cost savings, and portions of app movement in critical times (power failure), enabling a full use of a mesh compute network (such as multiple clients, cloud, edge, network) or other type networks.

Figure 11:
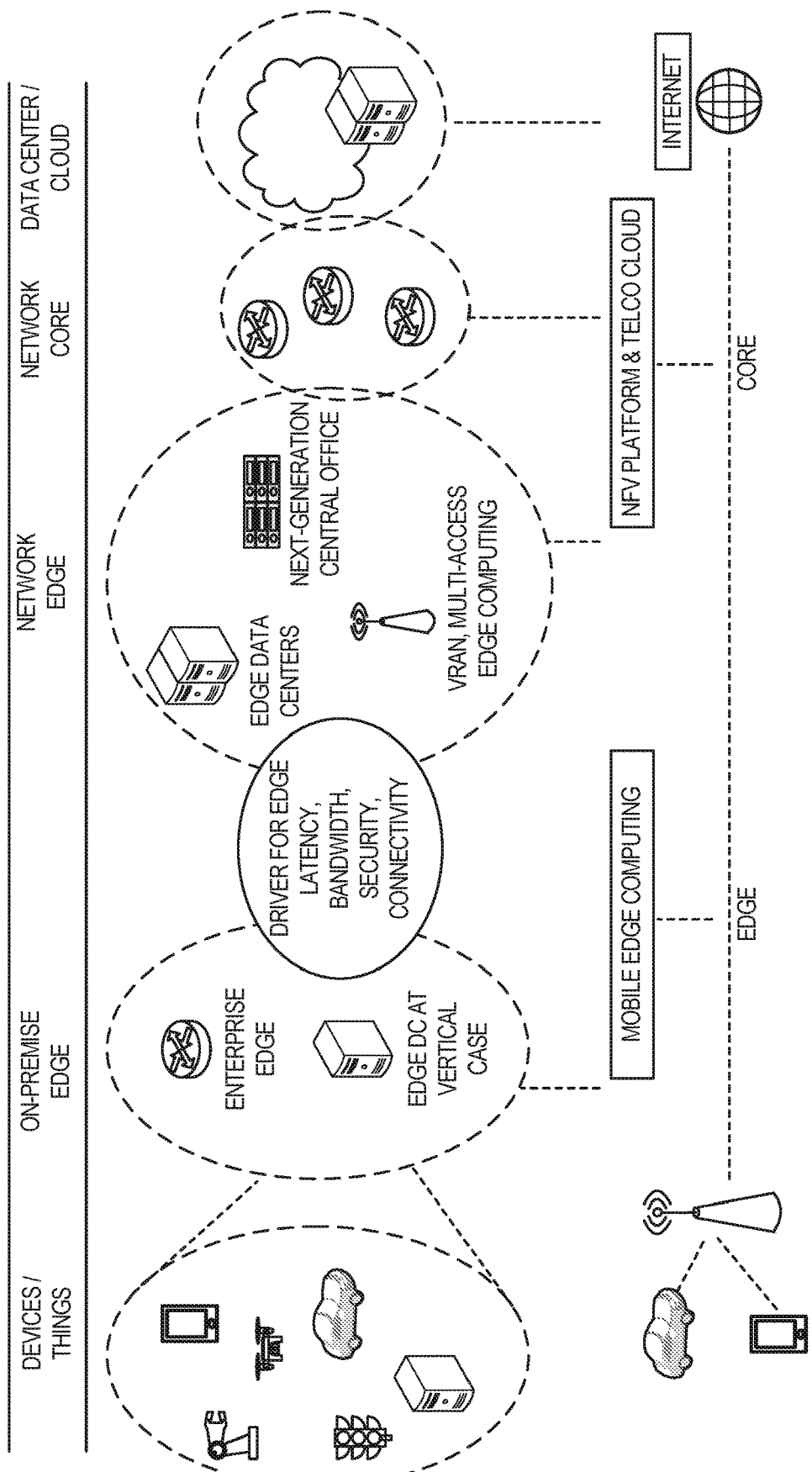
FIG. 11 illustrates an overview of services and use cases among edge and core networks, according to an example.

FIG. 11 illustrates an overview of services and use cases among edge and core networks. Referring to FIG. 11, this diagram illustrates the different types of use cases that exist at the network edge (with devices and things), and how on-premise edge hardware is designed to provide connectivity with such devices and things. The present techniques for dimensioning and segmenting, in particular, are relevant to computing aspects of the edge and core networks, extending to a variety of data centers, MEC deployments, core and data center equipment, even extending into cloud data center equipment.

Several challenges exist today for managing services and applications in this type of an environment, such as how to identify and collect data for latencies between nodes, connection types between client and servers, an unknown amount of compute, I/O, memory, and like capabilities at various locations, and how to dimension applications to accommodate such capabilities with different placement within the network. Thus, given the many types of client, network, and data center locations for computing operations, the present techniques are designed to automatically dimension an application to be distributed across such locations.

In an example, dimensioning techniques include capturing knowledge and training data representing latencies between computing devices and insight into the application, thus providing a learning of the application or a framework to enable application and service dimensioning. For instance, such insights may relate to what piece of the application can operate on a particular client, base station, central or regional office hardware, and how such an application operates. Once the learning of the application is performed, tags can be derived to enable placement of network dimensioning with fine-grained ability.

Another aspect evaluated by the present techniques may include a length of time needed to execute a particular application task, service, or compute operation. Tracking this information may enable evaluation of how long (or what amount) the compute, memory, and I/O resource is needed to meet requirements of service level agreements (SLAs) and to maximize the ability to utilize operations with mobile devices. This dynamic dimensioning may also change based on events, such as emergencies or changes in network resources.

As will be understood, MEC services may include a variety of use cases, such as (but not limited to): live broadcast processing, cloud gaming, industrial automation, smart retail, smart stadium, and the like. MEC applications may include applications developed for a variety of settings, such as: enterprise and cloud customer premise equipment; wireless access equipment; mobile access edge computing (MEC) systems; edge central offices; core network equipment; and the like. In this context, the proper operation of SLAs and resources within a MEC system may be improved through service dimensioning.

Figure 12:
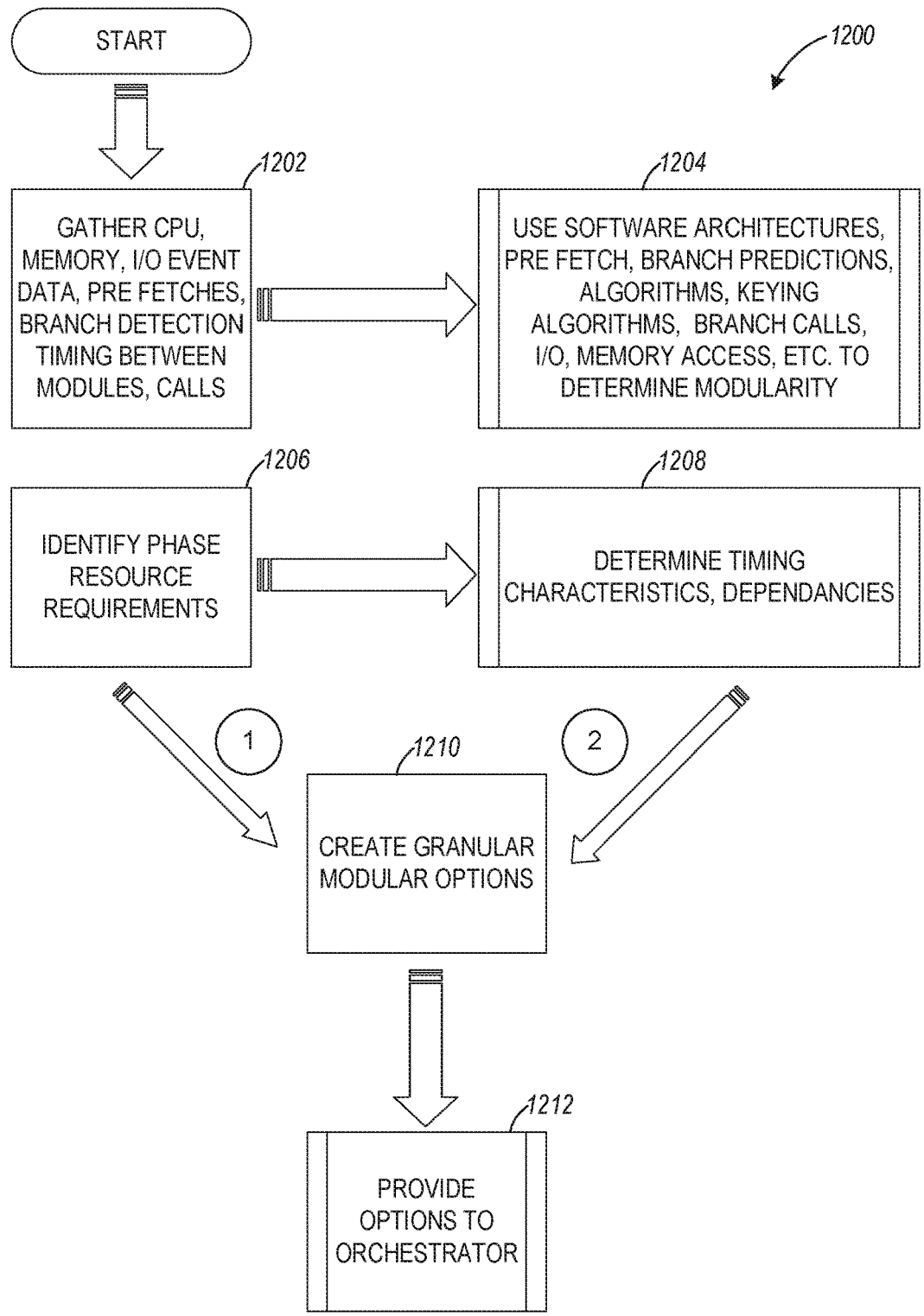
FIG. 12 illustrates a flowchart of service dimensioning operations deployed in connection with network service slicing, according to an example.

FIG. 12 illustrates a flowchart 1200 of service dimensioning operations deployed in connection with network service slicing. Referring to FIG. 12, this diagram illustrates the use of machine learning to dynamically dimension an application. Relevant system and operational data (e.g., telemetry data), such as CPU usage, memory usage, I/O event data, prefetches, brand detection, timing between function calls or workload execution phases, and other statistical, operational, or usage data is collected (operation 1202). This data is analyzed to determine modularity (operation 1204). Modularity encompasses the concepts of functional organization, memory access consolidation, independence of execution, and other aspects of modular programming. By separating functionality of an application or a suite of applications into independent, interchangeable modules (or workloads, or workload tasks), modular programming provides a way to scale processing and memory resources to meet the requirements of each module. Dimensioning refers to the concepts of modularizing an application and distributing the execution of the workload across one or more layers in a network to satisfy SLAs of an individual workload, an application, a function, or a service.

Modularity of an application may be determined by analyzing how the application is used across many uses of the application. Tracking the functions used, the memory access patterns, network usage, and other aspects of operation, portions of an application may be identified as being separable into a module.

An application's execution may be viewed as a series of phases. Each phase of an application may include use of one or more workloads. An application that is executed across multiple instances (e.g., when called by multiple clients) may cause resource contention because of overlapping phases. Phase resource requirements and the identification of respective options for application and service dimensioning may be analyzed (operation 1206). Timing characteristics and dependencies of application phases, both inter-application and intra-application, may be determined (operation 1208).

Phase timing and dependency information along with modularity determinations are used to create workloads (operation 1210). Some functions may be modularized in a number of alternative ways. Based on phase requirements, timing, and dependencies, a more optimal modulization scheme may be created in operation 1210. Workloads are not created based solely on CPU requirements, memory usage, I/O requirements, or the like, but instead are created more holistically by considering the entirety of the network resources, network and processing latencies, phase timing and dependencies, and other related information. This operation may be performed using an artificial intelligence engine, such as an engine that implements one or more machine learning models or algorithms.

One or more modulization schemes are provided to an orchestrator (operation 1212). The orchestrator may select a pathway or modification to the modularization scheme to implement.

In existing approaches, limited work has been considered in determining how much compute and cache is needed to result in a fingerprint which was created to optimize utilization of CPUs. Other approaches have attempted the implementation of dimensioning based on OSI Layers. However, the present techniques may consider additional hardware and software elements aspects relevant to dimensioning such as keying, latency, data access, length of time in and out, branches, branch prediction, calls, etc. The consideration of these individual elements enables dimensioning of code to enable automatic distribution enhancements for network slicing, edge compute, and many other industry initiatives. As a result, it will be understood that the use of machine learning and other AI techniques may identify software enhancements or segmentation within libraries or a variety of modules for dimensioning or segmenting code operations.

Figure 13:
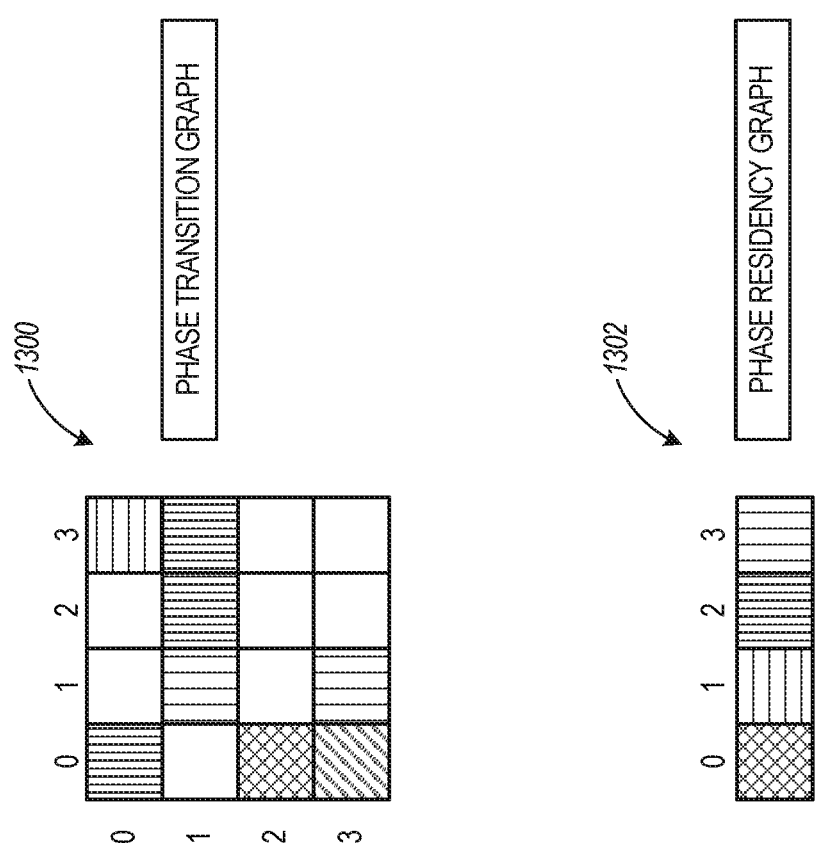
FIG. 13 illustrates heatmaps depicting a phase transition graph and a residency graph, according to an example.

FIG. 13 illustrates heatmaps depicting phase transition graph 1300 and residency graph 1302, according to an example. The phase transition graph 1300 indicates the probability of a workload transitioning from one phase (on the y-axis) to another phase (on the x-axis), with a transition having a higher or lower probability mapped to darker or lighter shades, respectively. A darker shaded section of the phase transition graph 1300 indicates that there are multiple co-located workloads that are likely to change phase at approximately the same time. For instance, the co-located workloads with darker shades in phase transition 2→0 may be analyzed for resource and contention requirements (e.g., resource analysis operation 1206). Additionally, the residency graph 1302 includes shaded areas that are used to visualize timing requirements, which considered when determining timing and dependencies in operation 1208 from above. In further examples, these heat maps are used as input to the AI models or algorithms discussed herein, such as in a scenario where a graphical representation of the phase transitions is used to model or modify application dimensioning scenarios.

Figure 14:
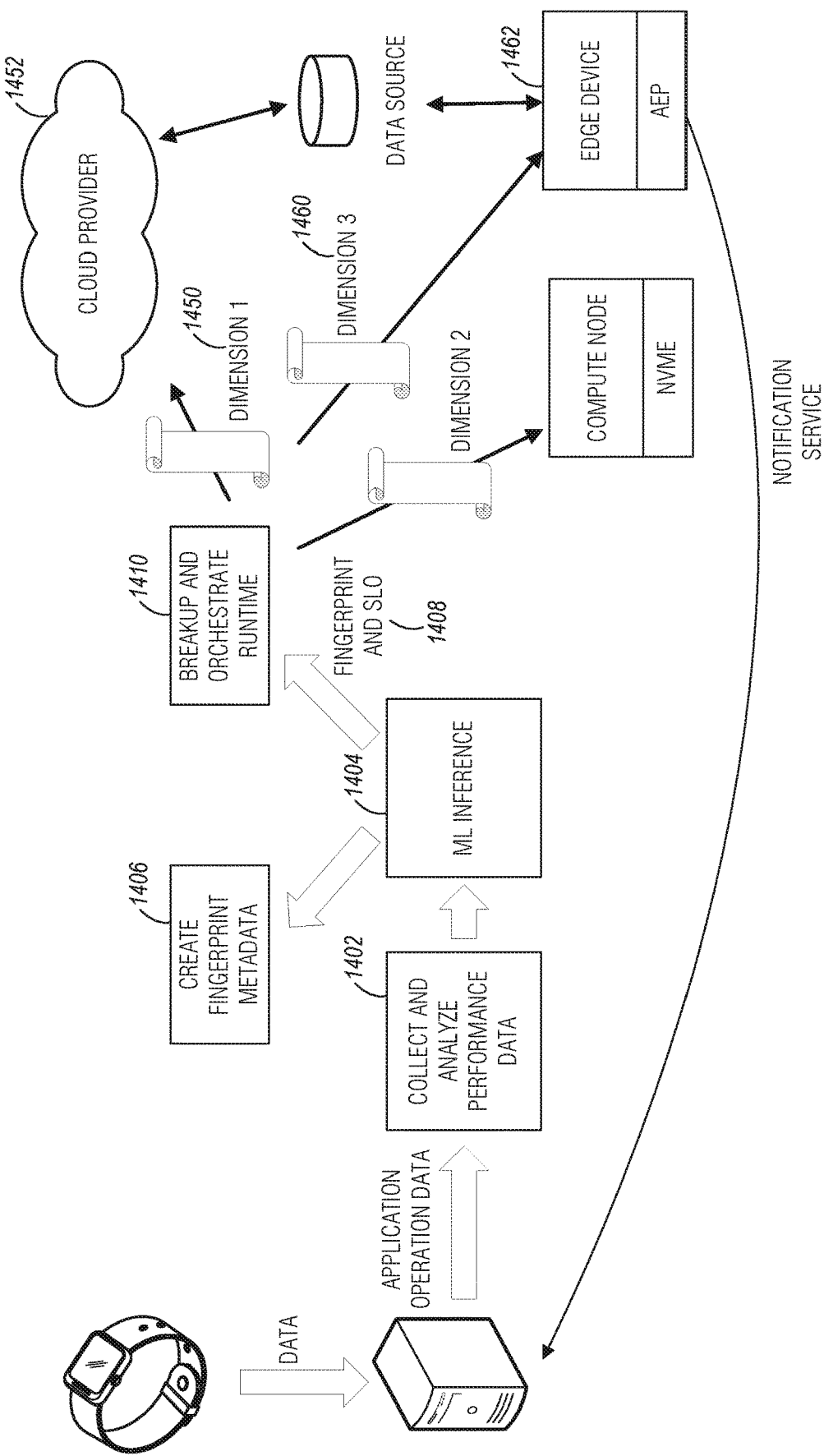
FIG. 14 illustrates an example edge computing use case invoking application dimensioning, according to an example.

FIG. 14 illustrates an example edge computing use case invoking application dimensioning, according to an example. Specifically, in this use case, data read from a device (in this case a smartwatch) needs to be analyzed and used for visualization and other computation. An application is used to analyze the data obtained from the device (operation 1402). The data may include various environmental data sensed from one or more sensors built into the device, user activity data, contextual factors, or the like. Examples include but are not limited to GPS data, ambient temperature data, IMU data, time, date, day of week, user biometric data, user calendar data, user contacts data, or the like.

The application is executed and performance data of how the application uses various functional components is collected (operation 1402).

A workload phase graph is constructed based on the analysis (operation 1404). This may be performed using a machine learning (ML) platform that analyzes one or many executions of the application on the data or similar data. The workload phase graph may include both a workload phase transition graph (e.g., phase transition graph 1300) and a workload residency graph (e.g., residency graph 1302). The workload phase graph (or graphs) represents a workload fingerprint in that it is relatively unique to the application and the data set that the application acted upon.

The workload phase graph is saved as a workload fingerprint (operation 1406) so that it may be referenced again. The workload fingerprint and a service level objective (SLO) are sent to an orchestrator (operation 1408). The orchestrator uses the workload fingerprint and SLO to determine which dimensions to activate (e.g., which functions are instantiated in the cloud, middle layer, or edge devices) (operation 1410). Based on the SLO and workload fingerprint, separate dimensions are activated. As illustrated in FIG. 14, one workload portion (e.g., module) 1450 is instantiated in a cloud provider 1452 and another workload portion (e.g., module) 1460 is instantiated in an edge device 1462. Data sources may common among multiple dimensions and may be hosted on a local memory (e.g., storage class memory) or in ephemeral storage on top of non-volatile memory express (NVMe) drives. In other situations, each workload portion (e.g., workload portion 1450 and workload portion 1460) maintain their own data storage and pass intermediate results as parameters from one workload portion to another.

Figure 15:
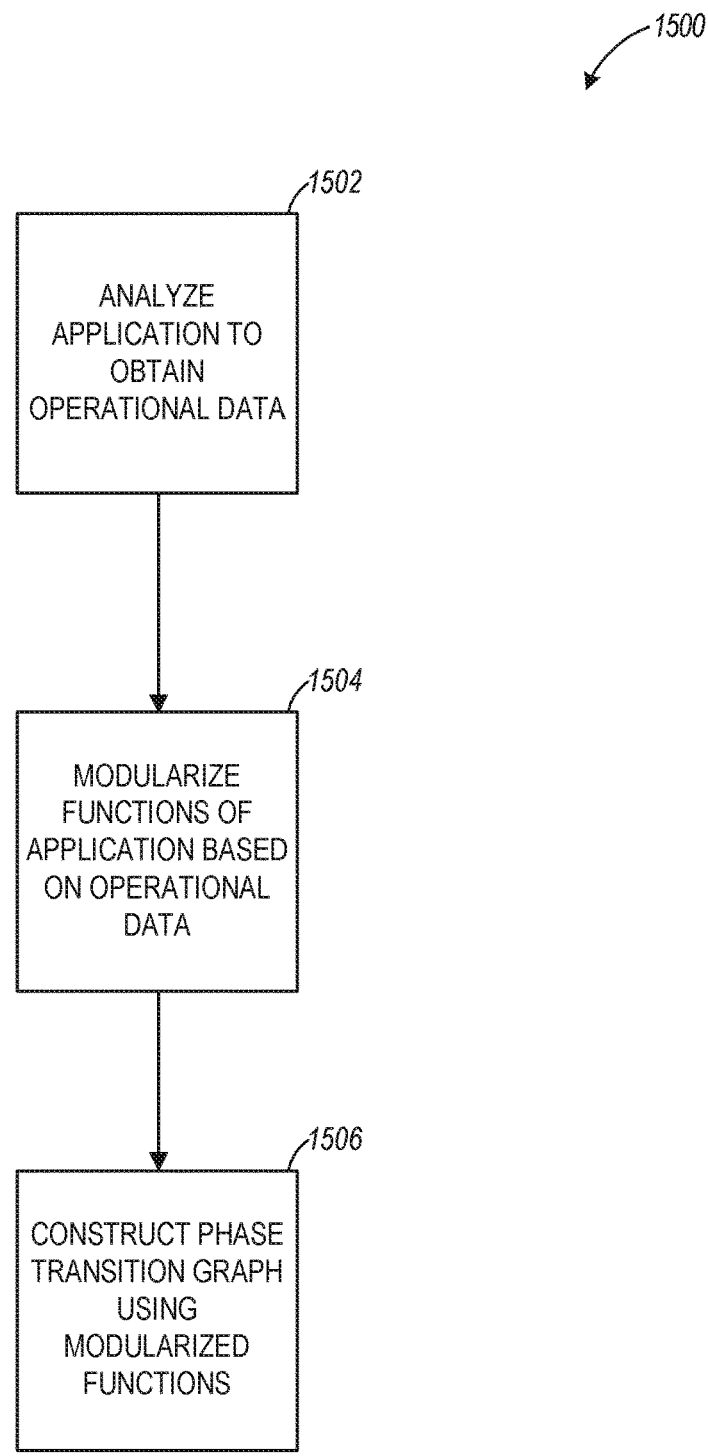
FIG. 15 is a flowchart illustrating a method for dimensioning an application, according to an example.

FIG. 15 is a flowchart illustrating a method 1500 for dimensioning an application, according to an example. Method 1500 may be performed by processing circuitry that is disposed on one or more compute nodes in a network. Compute nodes are processing devices capable of receiving data, processing data, storing data, and transmitting data to other compute nodes in the network. Example compute nodes include, but are not limited to edge nodes, edge servers, MEC hosts, UEs, application servers, gateways, routers, cloud servers, data center servers, orchestrators, and the like.

The method 1500 provides a way to determine which pieces of an application may be moved toward the edge to improve responsiveness and adhere to an SLA. The method 1500 may be extended to analyze and dimension multiple applications that may operate on the same network. The applications may be related (e.g., from the same vendor, provide inter-application functionality, or the like). Alternatively, the applications may not be related other than by sharing hardware or software resources on the network. The method 1500 may analyze multiple applications, construct phase transition graphs for each application based on the interactions with other applications, resources, or users on the network to dimension workloads across the network to improve several applications.

In the single-application example, execution of an application is analyzed to obtain operational data (operation 1502). The application may refer to a service, platform, executable application, thread, or other operational code that is able to execute on one or more nodes in a network. To analyze an application, one more software or hardware monitors may be used. The monitors may gather usage statistics such as memory usage, CPU usage, network usage, or the like. Monitoring may also gather more detailed usage down to the individual call stacks, event trapping, input or output data, or the like.

In an embodiment, analyzing execution of the application includes analyzing time complexity of the application. Time complexity refers to the computational complexity of a problem being solved by a computer program or function.

In an embodiment, analyzing execution of the application includes analyzing memory usage of the application. Functions that have more memory usage or memory accesses may be differentiated from those functions or modules that have fewer memory access or use less memory.

In an embodiment, analyzing execution of the application includes analyzing a plurality of simulated executions of the application. Simulating inputs and analyzing the operation of the application over a large number of executions is useful to determine trends during operation.

In an embodiment, analyzing execution of the application includes analyzing source code of the application. For instance, the number of lines of code for a particular function or module may be indicative of the complexity, memory usage, or processor usage corresponding to execution of such code.

In an embodiment, analyzing execution of the application includes analyzing call chains of the application. Call chains provide insight into how complex a call tree is, how many times a function or module is called in a time period, how much memory is used to service the call chain, etc.

In an embodiment, analyzing execution of the application includes analyzing events trapped by the application. Event-based programming relies on events being trapped by an operating system or other event monitor. When an event is trapped, certain event handler software is used. The greater number of events trapped may indicate a more complex or demanding function or module.

At 1504, functions of the application are modularized based on the operational data to construct modularized functions. In an embodiment, modularizing functions of the application includes identifying related functionality and constructing modularized functions based on the related functionality.

At 1506, a phase transition graph is constructed using a machine-learning based analysis, the phase transition graph representing state transitions from one modularized function to another modularized function, wherein the phase transition graph is used to the application by distributing the modularized functions across the network. In an embodiment, constructing the phase transition graph includes receiving a plurality of input vectors, each input vector representing a facet of the operational data. A machine learning model is used with the plurality of input vectors to identify phase transitions of higher probability and phase transitions of lower probability. The phase transition graph is constructed indicating the phase transitions of higher probability and the phase transitions of lower probability.

In an embodiment, to dimension the application, the application is vertically dimensioned across a network. Vertical dimensioning refers to dimensioning among different network layers, such as among the core and edge layers. In a related embodiment, to dimension the application, the application is horizontally dimensioned across a network. Horizontal dimensioning refers to dimensioning the application at approximately the same layer in the network (e.g., dimensioning an application across several edge nodes).

In further examples, other aspects of the operations 1502, 1504, and 1506 may be enhanced by the use of machine learning (or other artificial intelligence) models or algorithms, to assist the deployment, implementation, or use of network dimensioning. For example, AI analysis may be used to identify the characteristics of network resource latency, speed, and availability, on a real-time, historical, or as-needed basis, to help determine where functions may be dimensioned. Also for example, AI analysis may be used to verify that particular workloads or workload portions can be suitably dimensioned (or, rebalanced with dimensioning) to respective computer nodes or network locations, using horizontal or vertical dimensioning. Also for example, AI analysis may be utilized to determine the particular areas or phases of an application that are transitioning or trending (positively or negatively), which may assist in dividing or modularizing individual functions of an application. In all of these examples, the AI analysis works to assist the refactoring of the application to more effectively dimension and locate application modules, so that SLAs, latency requirements, backhaul and bandwidth, and other operational considerations can be met.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

Example 1 is a compute node, comprising: processing circuitry; and a memory device including instructions embodied thereon, wherein the instructions, which when executed by the processing circuitry, configure the processing circuitry to perform operations to: analyze execution of an application to obtain operational data; modularize functions of the application based on the operational data to construct modularized functions; and construct a phase transition graph using a machine-learning based analysis, the phase transition graph representing state transitions from one modularized function to another modularized function, wherein the phase transition graph is used to dimension the application by distributing the modularized functions across a network.

In Example 2, the subject matter of Example 1 includes, wherein to analyze execution of the application, the processing circuitry is to analyze time complexity of the application.

In Example 3, the subject matter of Examples 1-2 includes, wherein to analyze execution of the application, the processing circuitry is to analyze memory usage of the application.

In Example 4, the subject matter of Examples 1-3 includes, wherein to analyze execution of the application, the processing circuitry is to analyze a plurality of simulated executions of the application.

In Example 5, the subject matter of Examples 1-4 includes, wherein to analyze execution of the application, the processing circuitry is to analyze source code of the application.

In Example 6, the subject matter of Examples 1-5 includes, wherein to analyze execution of the application, the processing circuitry is to analyze call chains of the application.

In Example 7, the subject matter of Examples 1-6 includes, wherein to analyze execution of the application, the processing circuitry is to analyze events trapped by the application.

In Example 8, the subject matter of Examples 1-7 includes, wherein to modularize functions of the application, the processing circuitry is to identify related functionality and construct modularized functions based on the related functionality.

In Example 9, the subject matter of Examples 1-8 includes, wherein to construct the phase transition graph using a machine-learning based analysis, the processing circuitry is to: receive a plurality of input vectors, each input vector representing a facet of the operational data; use a machine learning model with the plurality of input vectors to identify phase transitions of higher probability and phase transitions of lower probability; and construct the phase transition graph indicating the phase transitions of higher probability and the phase transitions of lower probability.

In Example 10, the subject matter of Examples 1-9 includes, wherein to dimension the application, the application is vertically dimensioned across the network.

In Example 11, the subject matter of Examples 1-10 includes, wherein to dimension the application, the application is horizontally dimensioned across the network.

Example 12 is at least one machine-readable storage medium comprising instructions stored thereupon, which when executed by processing circuitry of a computing system, cause the processing circuitry to perform operations comprising: analyzing execution of an application to obtain operational data; modularizing functions of the application based on the operational data to construct modularized functions; and constructing a phase transition graph using a machine-learning based analysis, the phase transition graph representing state transitions from one modularized function to another modularized function, wherein the phase transition graph is used to dimension the application by distributing the modularized functions across a network.

In Example 13, the subject matter of Example 12 includes, wherein analyzing execution of the application comprises analyzing time complexity of the application.

In Example 14, the subject matter of Examples 12-13 includes, wherein analyzing execution of the application comprises analyzing memory usage of the application.

In Example 15, the subject matter of Examples 12-14 includes, wherein analyzing execution of the application comprises analyzing a plurality of simulated executions of the application.

In Example 16, the subject matter of Examples 12-15 includes, wherein analyzing execution of the application comprises analyzing source code of the application.

In Example 17, the subject matter of Examples 12-16 includes, wherein analyzing execution of the application comprises analyzing call chains of the application.

In Example 18, the subject matter of Examples 12-17 includes, wherein analyzing execution of the application comprises analyzing events trapped by the application.

In Example 19, the subject matter of Examples 12-18 includes, wherein modularizing functions of the application comprises identifying related functionality and construct modularized functions based on the related functionality.

In Example 20, the subject matter of Examples 12-19 includes, constructing the phase transition graph using a machine-learning based analysis comprises: receiving a plurality of input vectors, each input vector representing a facet of the operational data; using a machine learning model with the plurality of input vectors to identify phase transitions of higher probability and phase transitions of lower probability; and constructing the phase transition graph indicating the phase transitions of higher probability and the phase transitions of lower probability.

In Example 21, the subject matter of Examples 12-20 includes, wherein dimensioning the application comprises vertically dimensioning across the network.

In Example 22, the subject matter of Examples 12-21 includes, wherein dimensioning the application comprises horizontally dimensioning across the network.

Example 23 is a method comprising: analyzing execution of an application to obtain operational data; modularizing functions of the application based on the operational data to construct modularized functions; and constructing a phase transition graph using a machine-learning based analysis, the phase transition graph representing state transitions from one modularized function to another modularized function, wherein the phase transition graph is used to dimension the application by distributing the modularized functions across a network.

In Example 24, the subject matter of Example 23 includes, wherein analyzing execution of the application comprises analyzing time complexity of the application.

In Example 25, the subject matter of Examples 23-24 includes, wherein analyzing execution of the application comprises analyzing memory usage of the application.

In Example 26, the subject matter of Examples 23-25 includes, wherein analyzing execution of the application comprises analyzing a plurality of simulated executions of the application.

In Example 27, the subject matter of Examples 23-26 includes, wherein analyzing execution of the application comprises analyzing source code of the application.

In Example 28, the subject matter of Examples 23-27 includes, wherein analyzing execution of the application comprises analyzing call chains of the application.

In Example 29, the subject matter of Examples 23-28 includes, wherein analyzing execution of the application comprises analyzing events trapped by the application.

In Example 30, the subject matter of Examples 23-29 includes, wherein modularizing functions of the application comprises identifying related functionality and construct modularized functions based on the related functionality.

In Example 31, the subject matter of Examples 23-30 includes, constructing the phase transition graph using a machine-learning based analysis comprises: receiving a plurality of input vectors, each input vector representing a facet of the operational data; using a machine learning model with the plurality of input vectors to identify phase transitions of higher probability and phase transitions of lower probability; and constructing the phase transition graph indicating the phase transitions of higher probability and the phase transitions of lower probability.

In Example 32, the subject matter of Examples 23-31 includes, wherein dimensioning the application comprises vertically dimensioning across the network.

In Example 33, the subject matter of Examples 23-32 includes, wherein dimensioning the application comprises horizontally dimensioning across the network.

Example 34 is at least one machine-readable medium including instructions that, when executed by processing circuitry, cause the processing circuitry to perform operations to implement of any of Examples 1-33.

Example 35 is an apparatus comprising means to implement of any of Examples 1-33.

Example 36 is a system to implement of any of Examples 1-33.

Example 37 is at least one non-transitory machine-readable storage medium comprising instructions or stored data which may be configured into instructions, wherein the instructions, when configured and executed by processing circuitry of a computing device, cause the processing circuitry to perform any of the operations of Examples 1 to 33.

Example 38 is one or more computer-readable storage media comprising data to cause an electronic device, upon loading, execution, configuration, or provisioning of the data by one or more processors or electronic circuitry of the electronic device, to perform one or more elements of operations described in or related to any of Examples 1 to 33, or any other method or process described herein.

Example 39 is an apparatus comprising logic, modules, or circuitry to perform one or more elements of a method described in or related to any of Examples 1 to 33, or any other method or process described herein.

Example 40 is a method, technique, or process as described in or related to any of Examples 1 to 33, or portions or parts thereof.

Example 41 is an apparatus comprising: one or more processors and one or more computer readable media comprising instructions that, when executed by the one or more processors, cause the one or more processors to perform the method, techniques, or process as described in or related to any of Examples 1 to 33, or portions thereof.

Example 42 is a device for processing communication as described in or related to any of Examples 1 to 33, or as otherwise shown and described herein.

Example 43 is a network comprising respective devices and device communication mediums for performing any of the operations of Examples 1 to 33, or as otherwise shown and described herein.

Example 44 is a device fog implementation comprising processing nodes and computing units adapted for performing any of the operations of Examples 1 to 33, or as otherwise shown and described herein.

Example 45 is an Internet of Things (IoT) network configuration comprising respective communication links, communication circuitry, or processing circuitry for performing any of the operations of Examples 1 to 33, or as otherwise shown and described herein.

Example 46 is an edge computing system implementation comprising processing nodes and computing units adapted for performing any of the operations of Examples 1 to 33, or as otherwise shown and described herein.

Example 47 is an edge cloud computing device implementation comprising processing nodes and computing units adapted for performing any of the operations of Examples 1 to 33, or as otherwise shown and described herein.

Example 48 is an apparatus comprising means to implement of any of Examples 1 to 33.

Example 49 is a system to implement of any of Examples 1 to 33.

Example 50 is a method to implement of any of Examples 1 to 33.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A compute node, comprising:
processing circuitry; and
a memory device including instructions embodied thereon, wherein the instructions, which when executed by the processing circuitry, configure the processing circuitry to perform operations to:
analyze execution of an application to obtain operational data;
modularize functions of the application based on the operational data to construct modularized functions; and
construct a phase transition graph using a machine-learning based analysis, the phase transition graph representing state transitions from one modularized function to another modularized function, wherein the phase transition graph is used to dimension the application by distributing the modularized functions across a network.

2. The compute node of claim 1, wherein to analyze execution of the application, the processing circuitry is to analyze time complexity of the application.

3. The compute node of claim 1, wherein to analyze execution of the application, the processing circuitry is to analyze memory usage of the application.

4. The compute node of claim 1, wherein to analyze execution of the application, the processing circuitry is to analyze a plurality of simulated executions of the application.

5. The compute node of claim 1, wherein to analyze execution of the application, the processing circuitry is to analyze source code of the application.

6. The compute node of claim 1, wherein to analyze execution of the application, the processing circuitry is to analyze call chains of the application.

7. The compute node of claim 1, wherein to analyze execution of the application, the processing circuitry is to analyze events trapped by the application.

8. The compute node of claim 1, wherein to modularize functions of the application, the processing circuitry is to identify related functionality and construct modularized functions based on the related functionality.

9. The compute node of claim 1, wherein to construct the phase transition graph using a machine-learning based analysis, the processing circuitry is to:
receive a plurality of input vectors, each input vector representing a facet of the operational data;
use a machine learning model with the plurality of input vectors to identify phase transitions of higher probability and phase transitions of lower probability; and
construct the phase transition graph indicating the phase transitions of higher probability and the phase transitions of lower probability.

10. The compute node of claim 1, wherein to dimension the application, the application is vertically dimensioned across the network.

11. The compute node of claim 1, wherein to dimension the application, the application is horizontally dimensioned across the network.

12. At least one machine-readable storage medium comprising instructions stored thereupon, which when executed by processing circuitry of a computing system, cause the processing circuitry to perform operations comprising:
analyzing execution of an application to obtain operational data;
modularizing functions of the application based on the operational data to construct modularized functions; and
constructing a phase transition graph using a machine-learning based analysis, the phase transition graph representing state transitions from one modularized function to another modularized function, wherein the phase transition graph is used to dimension the application by distributing the modularized functions across a network.

13. The at least one machine-readable storage medium of claim 12, wherein analyzing execution of the application comprises analyzing time complexity of the application.

14. The at least one machine-readable storage medium of claim 12, wherein analyzing execution of the application comprises analyzing memory usage of the application.

15. The at least one machine-readable storage medium of claim 12, wherein analyzing execution of the application comprises analyzing a plurality of simulated executions of the application.

16. The at least one machine-readable storage medium of claim 12, wherein analyzing execution of the application comprises analyzing source code of the application.

17. The at least one machine-readable storage medium of claim 12, wherein analyzing execution of the application comprises analyzing call chains of the application.

18. The at least one machine-readable storage medium of claim 12, wherein analyzing execution of the application comprises analyzing events trapped by the application.

19. The at least one machine-readable storage medium of claim 12, wherein modularizing functions of the application comprises identifying related functionality and construct modularized functions based on the related functionality.

20. The at least one machine-readable storage medium of claim 12, constructing the phase transition graph using a machine-learning based analysis comprises:
receiving a plurality of input vectors, each input vector representing a facet of the operational data;
using a machine learning model with the plurality of input vectors to identify phase transitions of higher probability and phase transitions of lower probability; and
constructing the phase transition graph indicating the phase transitions of higher probability and the phase transitions of lower probability.

21. The at least one machine-readable storage medium of claim 12, wherein dimensioning the application comprises vertically dimensioning across the network.

22. The at least one machine-readable storage medium of claim 12, wherein dimensioning the application comprises horizontally dimensioning across the network.

23. A method comprising:
analyzing execution of an application to obtain operational data;
modularizing functions of the application based on the operational data to construct modularized functions; and
constructing a phase transition graph using a machine-learning based analysis, the phase transition graph representing state transitions from one modularized function to another modularized function, wherein the phase transition graph is used to dimension the application by distributing the modularized functions across a network.

24. The method of claim 23, constructing the phase transition graph using a machine-learning based analysis comprises:
receiving a plurality of input vectors, each input vector representing a facet of the operational data;
using a machine learning model with the plurality of input vectors to identify phase transitions of higher probability and phase transitions of lower probability; and
constructing the phase transition graph indicating the phase transitions of higher probability and the phase transitions of lower probability.

25. The method of claim 23, wherein dimensioning the application comprises vertically dimensioning across the network.

* * * * *